United States Patent
Gagnon et al.

(10) Patent No.: US 9,849,987 B2
(45) Date of Patent: Dec. 26, 2017

(54) AIRCRAFT SIDEBOARD

(71) Applicant: BOMBARDIER INC., Dorval (CA)

(72) Inventors: Pierre Gagnon, Vaudreuil (CA); Tom Deka, Ste-Catherine (CA); Patrick Fahmy, Montreal (CA); Michele Monardo, Montreal (CA)

(73) Assignee: BOMBARDIER INC., Dorval, Quebec (CA)

( * ) Notice: Subject to any disclaimer, the term of this patent is extended or adjusted under 35 U.S.C. 154(b) by 371 days.

(21) Appl. No.: 14/428,243

(22) PCT Filed: Oct. 8, 2012

(86) PCT No.: PCT/US2012/059188
§ 371 (c)(1),
(2) Date: Mar. 13, 2015

(87) PCT Pub. No.: WO2014/051638
PCT Pub. Date: Apr. 3, 2014

(65) Prior Publication Data
US 2015/0259072 A1    Sep. 17, 2015
US 2016/0244169 A2    Aug. 25, 2016

Related U.S. Application Data

(60) Provisional application No. 61/708,020, filed on Sep. 30, 2012.

(51) Int. Cl.
*B64D 11/06* (2006.01)
*B64D 11/00* (2006.01)

(52) U.S. Cl.
CPC ...... *B64D 11/0638* (2014.12); *B64D 11/0007* (2013.01); *B64D 11/0015* (2013.01);
(Continued)

(58) Field of Classification Search
CPC ............ B64D 11/0638; B64D 11/0015; B64D 11/0624; B64D 11/0636; B64D 11/0604; B64D 11/0007
See application file for complete search history.

(56) References Cited

U.S. PATENT DOCUMENTS

2001/0000639 A1    5/2001    Park et al.
2003/0188672 A1    10/2003    Parent et al.
(Continued)

FOREIGN PATENT DOCUMENTS

CN    1132711 A    10/1996
CN    1197623 A    11/1998
(Continued)

OTHER PUBLICATIONS

Chinese Office Action dated Aug. 2, 2016, for Chinese Patent Application No. 201280076154.8.
(Continued)

*Primary Examiner* — Valentina Xavier
(74) *Attorney, Agent, or Firm* — Karceski IP Law, PLLC

(57) ABSTRACT

An aircraft sideboard includes a first portion with a first top surface and a first panel. The first top surface is disposed substantially horizontally at a first height and the first panel is disposed substantially vertically adjacent to the first top surface. A second portion is disposed adjacent to the first portion at a first end of the first portion. The second portion includes a second top surface and a second panel. The second top surface is disposed substantially horizontally at a second height and the second panel is disposed substantially vertically adjacent to the second top surface. A table is stowed interiorly to the first portion. The table extends from the first portion when deployed. The first top surface is immovable. The table deploys by tilting the first panel along
(Continued)

a pivot axis defined adjacent to a bottom end thereof. The first height is greater than the second height.

24 Claims, 25 Drawing Sheets

(52) U.S. Cl.
CPC ...... *B64D 11/0604* (2014.12); *B64D 11/0624* (2014.12); *B64D 11/0636* (2014.12)

(56) References Cited

U.S. PATENT DOCUMENTS

| | | | |
|---|---|---|---|
| 2005/0012375 A1* | 1/2005 | Giasson | B64D 11/06 297/411.31 |
| 2007/0262625 A1 | 11/2007 | Dryburgh et al. | |
| 2008/0252109 A1* | 10/2008 | Salzer | B60N 2/46 297/173 |
| 2012/0104165 A1 | 5/2012 | Dobrusin et al. | |
| 2016/0340041 A1* | 11/2016 | Peuziat | B64D 11/0015 |

FOREIGN PATENT DOCUMENTS

| | | |
|---|---|---|
| CN | 1950256 A | 4/2007 |
| CN | 101142119 A | 3/2008 |
| CN | 102438901 A | 5/2012 |
| WO | WO 2006030228 A1 | 3/2006 |
| WO | WO 2012050587 A1 | 4/2012 |

OTHER PUBLICATIONS

Chinese Office Action dated Jan. 23, 2017, for Chinese Patent Application No. 201280076154.8.
Chinese Notification of First Office Action dated Nov. 16, 2015, for Chinese Patent Application No. 201280076154.8.
International Preliminary Report on Patentability dated Apr. 9, 2015, for International Patent Application No. PCT/US2012/059188.
International Search Report and Written Opinion dated Jun. 10, 2013, for International Patent Application No. PCT/US2012/059188.

* cited by examiner

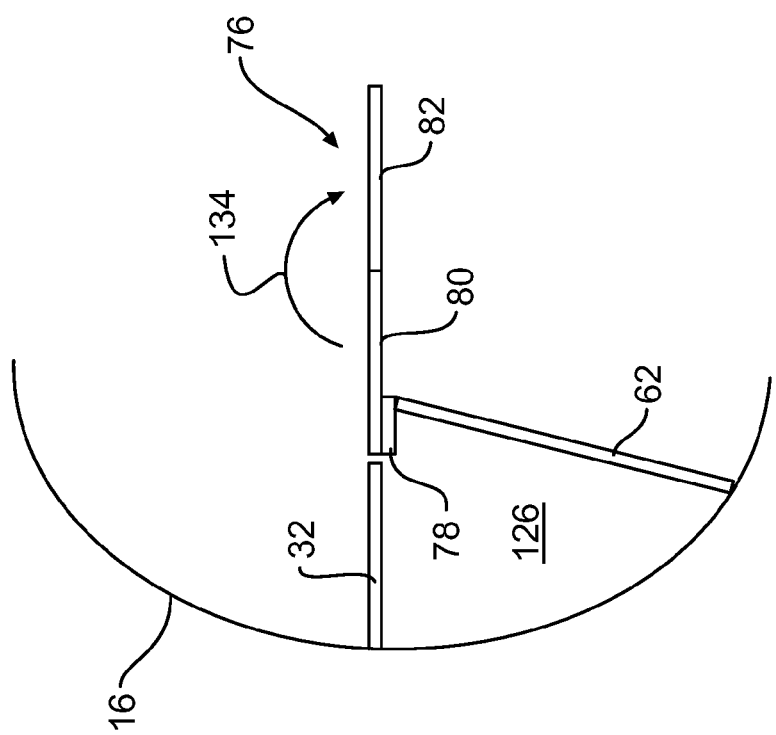

AIRCRAFT SIDEBOARD

CROSS-REFERENCE TO RELATED APPLICATION(S)

This application relies for priority on U.S. Provisional Patent Application Ser. No. 61/708,020, entitled "AIRCRAFT SIDEBOARD," filed 30 Sep. 2012, which is hereby incorporated by reference in its entirety.

FIELD OF THE INVENTION

The present invention concerns the construction and operation of a sideboard for an aircraft, in particular a sideboard for a cabin interior of an aircraft. Specifically, the present invention concerns the construction and operation of a sideboard for an aircraft that incorporates a stowable table, among other features. In addition, the present invention concerns a seating arrangement that cooperates with the sideboard.

DESCRIPTION OF THE RELATED ART

The prior art includes examples of several features that may be added to the interior of an aircraft to enhance passenger comfort and improve accessibility to selected amenities.

For example, most persons are familiar with stowable tables that are provided on most, if not all, modern aircraft. Not surprisingly, therefore, the prior art includes multiple examples of various types of stowable tables for aircraft.

For example, U.S. Patent Application Publication No. 2003/0188672 (hereinafter "the '672 Application") describes a stowable surface, such as a table. In the deployed condition, which is illustrated in FIGS. 1 and 7, for example, the table top assembly 12 is supported by a lower leg assembly 40.

In addition, modern aircraft typically include display devices, one for each seat, that permit passengers to access entertainment channels, video games, information about the aircraft, and informational details about the flight, in addition to other conveniences.

There are a number of additional personal conveniences that are provided to enhance a passenger's comfort and to provide sufficient work space. Despite the conveniences that are provided, there remains room for additional enhancements.

SUMMARY OF THE INVENTION

The present invention addresses one or more deficiencies associated with the interior design of aircraft.

One aspect of the present invention provides a sideboard for an aircraft that includes a first portion with a first top surface and a first panel. The first top surface is disposed substantially horizontally at a first height. The first panel is disposed substantially vertically adjacent to the first top surface. The sideboard also includes a second portion disposed adjacent to the first portion at a first end of the first portion. The second portion has a second top surface and a second panel. The second top surface is disposed substantially horizontally at a second height. The second panel is disposed substantially vertically adjacent to the second top surface. The sideboard also includes a table disposed interiorly to the first portion. The table is disposed within the first portion in a stowed condition and the table is extendible from the first portion in a deployed condition. The first top surface is immovable and the table is deployable by tilting the first panel along a pivot axis defined adjacent to a bottom end of the first panel. The first height is greater than the second height.

In another contemplated embodiment, the sideboard includes a first transition region that provides an angled surface extending between the first top surface and the second top surface.

Still further, the present invention contemplates a construction where a first display is disposed in a first display panel angled surface forming a part of the first transition region.

The sideboard of the present invention also may include a first cup holder disposed on the first top panel adjacent to the second top panel.

It is contemplated that the sideboard of the present invention also may include a third portion disposed adjacent to the first portion at a second end of the first portion. The third portion has a third top surface and a third panel. The third top surface is disposed substantially horizontally at a third height. The third panel is disposed substantially vertically adjacent to the third top surface.

In one contemplated embodiment of the present invention, the first height is greater than both the second height and the third height.

In another contemplated embodiment, the second height is substantially equal to the third height.

The present invention also contemplates the inclusion of a second transition region providing an angled surface that extends between the first top surface and the third top surface.

In this contemplated embodiment, a second display may be disposed in a second display panel angled surface forming a part of the second transition region.

Another aspect of the present invention contemplates that a second cup holder is disposed on the first top panel adjacent to the third top panel.

Additionally, the table of the present invention may include a first leaf pivotally connected adjacent to the first panel and a second leaf pivotally connected to the first leaf. The second leaf and the first leaf are capable of folding open when the table is in the deployed condition, thereby increasing a surface area of the table.

It is also contemplated that the sideboard includes at least one rail disposed interiorly to the central panel defining a track therein. The table is pivotally and slidingly connected to the at least one rail.

Still further, the present invention provides for a sideboard with a first compartment disposed beneath the second top surface and a second compartment disposed beneath the third top surface. In this configuration, the second top surface and the third top surface are openable to provide access to the first compartment and to the second compartment.

A further embodiment of the sideboard of the present invention includes a first portion comprising a first top surface and a first panel. The first top surface is disposed substantially horizontally at a first height. The first panel is disposed substantially vertically adjacent to the first top surface. The sideboard in this embodiment also includes a second portion disposed adjacent to the first portion at a first end of the first portion, the second portion having a second top surface and a second panel. The second top surface is disposed substantially horizontally at a second height and wherein the second panel is disposed substantially vertically adjacent to the second top surface. A first transition region provides an angled surface that extends between the first top surface and the second top surface. A first display is disposed in a first display panel angled surface forming a part of the first transition region. A table is disposed interiorly to the first portion. The table is disposed within the first portion in a stowed condition and the table is extendible from the first portion in a deployed condition. The first top surface is immovable and the table is deployable by tilting the first panel along a pivot axis defined adjacent to a bottom end of the first panel.

Still further features of the present invention should be appreciated from the drawings appended hereto and from the discussion herein.

BRIEF DESCRIPTION OF THE DRAWINGS

The present invention will now be described in connection with the drawings appended hereto, in which:

FIG. 27 is a graphical, end view of the sideboard illustrated in FIG. 23, showing a third step in the deployment of the table.

DETAILED DESCRIPTION OF EMBODIMENT(S) OF THE INVENTION

The present invention will now be described in connection with one or more embodiments. Discussion of any one particular embodiment is intended to be illustrative of the breadth and scope of the invention. In other words, while attention is focused on specific embodiments, those embodiments are not intended to be limiting of the scope of the present invention. To the contrary, after appreciating the discussion and drawings presented herein, those skilled in the art will readily appreciate one or more variations and equivalents of the embodiments described and illustrated. Those variations and equivalents are intended to be encompassed by the present invention as though they were described herein.

As a point of convention, as should be understood by those skilled in the art, an aircraft includes a front end and a rear end that define a longitudinal axis. The wings, which extend outwardly from the fuselage of the aircraft, define a lateral axis. In the discussion that follows, therefore, reference to a longitudinal axis is intended to refer to an axis parallel to the longitudinal axis of the aircraft. Similarly, reference to a lateral axis is intended to refer to an axis that is parallel to the lateral axis of the aircraft.

As another point of convention, the terms "front," "rear," "right," "left," "starboard," and "port" are intended to refer to directions that are consistent with the direction of travel of a conventional aircraft. The use of these conventions, however, is not intended to be limiting of the present invention. To the contrary, these terms are used merely to facilitate discussion of the considerable breadth and scope of the present invention.

Figure 1:
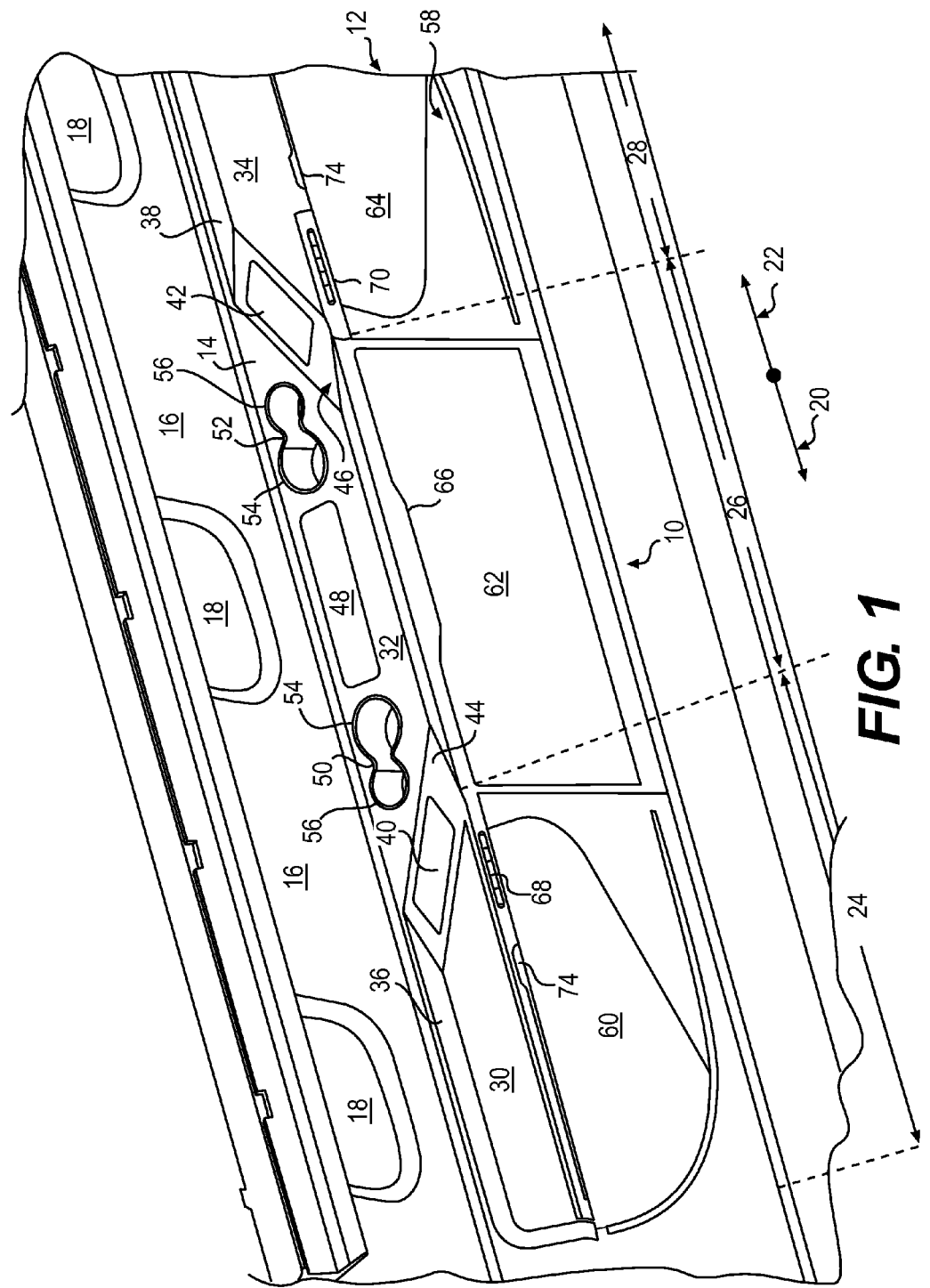
FIG. 1 is a perspective illustration of a portion of an aircraft interior, illustrating one contemplated embodiment of a sideboard of the present invention.

FIG. 1 is perspective illustration of a sideboard 10 for an aircraft 12 according to the present invention (also referred to as a "dado panel" for a person skilled in the art of the present invention). The sideboard 10 includes a top surface 14 that extends from a sidewall 16 (or fuselage wall 16) into the interior of the aircraft 12. For reference, three windows 18 are shown in the sidewall 16 of the aircraft 12. Also for reference, a forward direction 20 and an aft direction 22 of the aircraft are indicated.

In FIG. 1, the sideboard 10 defines a forward region 24, a central region 26, and an aft region 28, all three of which are designated generally. The forward region 24 and the aft region 28 flank the central region 26.

The top surface 14 of the sideboard 10 may be divided into three regions consistent with the definition of the forward region 24, the central region 26, and the aft region 28. In the illustrated embodiment, the central region 26 is configured to have a height that is greater than the forward region 24 and the aft region 28. In this embodiment, the height of the top surface of the forward region 24 and the aft region 28 is the same.

As is apparent from FIG. 1, the portion of the top surface 14 that is within the forward region 24 with a height lower than the height of the central region 26 is defined as the forward top surface 30. The portion of the top surface 14 within the central region 26 is designated as the central top surface 32. The portion of the top surface 14 of the aft region 28 that is lower than the central top surface 32 is designated as the aft top surface 34. As should be apparent from the various illustrations of the sideboard 10, the forward top surface 30 and the aft top surface 34 are mirror images of one another, with the central top surface 32 defining a point (or line) of symmetry therebetween.

In one contemplated embodiment of the sideboard 10 of the present invention, the forward top surface 30 may be hingedly connected to the top surface 14 such that the forward top surface 30 may be opened. Similarly, the aft top surface 34 may be hinged to the top surface 14 so that the aft top surface 34 may be opened. In either case, the forward top surface 30 and the aft top surface 34 may reveal a storage compartment concealed therebeneath. Alternatively, the forward top surface 30 and the aft top surface 34 may expose a tray table, a personal entertainment center, a telephone, or any of a wide variety of items that are preferentially concealed from view.

A forward transition region 36 defines a sloped surface between the top surface 14 and the forward top surface 30. Similarly, an aft transition region 38 defines a sloped surface between the top surface 14 and the aft top surface 34. The forward transition region 36 includes a forward display panel 40 therein. Similarly, the aft transition region 38 includes an aft display panel 42 therein. As should be apparent from FIG. 1, the forward transition region 36 includes a forward display panel angled surface 44. Similarly, the aft transition region 38 includes an aft display panel angled surface 46.

The angled surfaces 44, 46 permit the display panels 40, 42 to be disposed at angles to facilitate viewing of the visual information displayed thereby. It is contemplated, in an alternative embodiment, that the display panels 40, 42 need not be parallel to the angled surfaces 44, 46. In other words, the angled surfaces 44, 46 may be disposed at angular orientations that differ from the angular orientations of the display panels 40, 42 without departing from the scope of the present invention.

It is noted that the display panels 40, 42 may not be included solely to provide visual output to a passenger. It is contemplated that the display panels 40, 42 may be touch-sensitive. If so, the display panels 40, 42 also may receive input to control one or more functions. For example, the display panels 40, 42 may provide control over in-flight entertainment function. This includes, but is not limited to selection of a particular type of output (such as a particular video or musical sampling, for example). Control over other functions also may be provided, as should be apparent to those skilled in the art. For example, control may be provided over any lighting for the passenger or positioning of the passenger's seat. Moreover, the display panels 40, 42 may be equipped to provide a call function to summon a flight attendant, for example. Additionally, the display panels 40, 42 may display information such as an icon to instruct a passenger to fasten his or her seat belt, for example.

With continued reference to FIG. 1, the central top surface 32 includes an access panel 48. The access panel 48 is provided so that passengers may access one or more electronic systems available on the aircraft. For example, the access panel may cover a power outlet or a connector for an audio and/or video output. Alternatively, the access panel 44 may cover one or more data input ports, which may be made available depending upon the configuration for the aircraft.

In an alternative embodiment, it is contemplated that the access panel may cover a retractable display panel. In this embodiment, the retractable display panel may extend vertically upwardly from the central top surface 32. When extended, the retractable display possibly offers a larger display area for personal entertainment features.

As should be apparent from the illustrations submitted herewith, the configuration for an aircraft interior is contemplated to be deployed in a private airplane or a corporate jet. While contemplated for use in a limited set of aircraft environments, the present invention should not be considered as being limited solely to private use. It is contemplated that the present invention may be employed in commercial aircraft as well.

In addition, while the present invention is contemplated to be made available in aircraft, it is contemplated that the present invention may be employed in other vehicle types. For example, the sideboard and seating arrangement of the present invention may be provided in the car of a passenger train or a recreational vehicle, for example.

Returning to FIG. 1, the central top surface 32 also includes a forward cup holder 50 and an aft cup holder 52. The cup holders 50, 52 are positioned on either side of the access panel 48, between the access panel 48 and respective display panel angled surfaces 44, 46.

Figure 8:
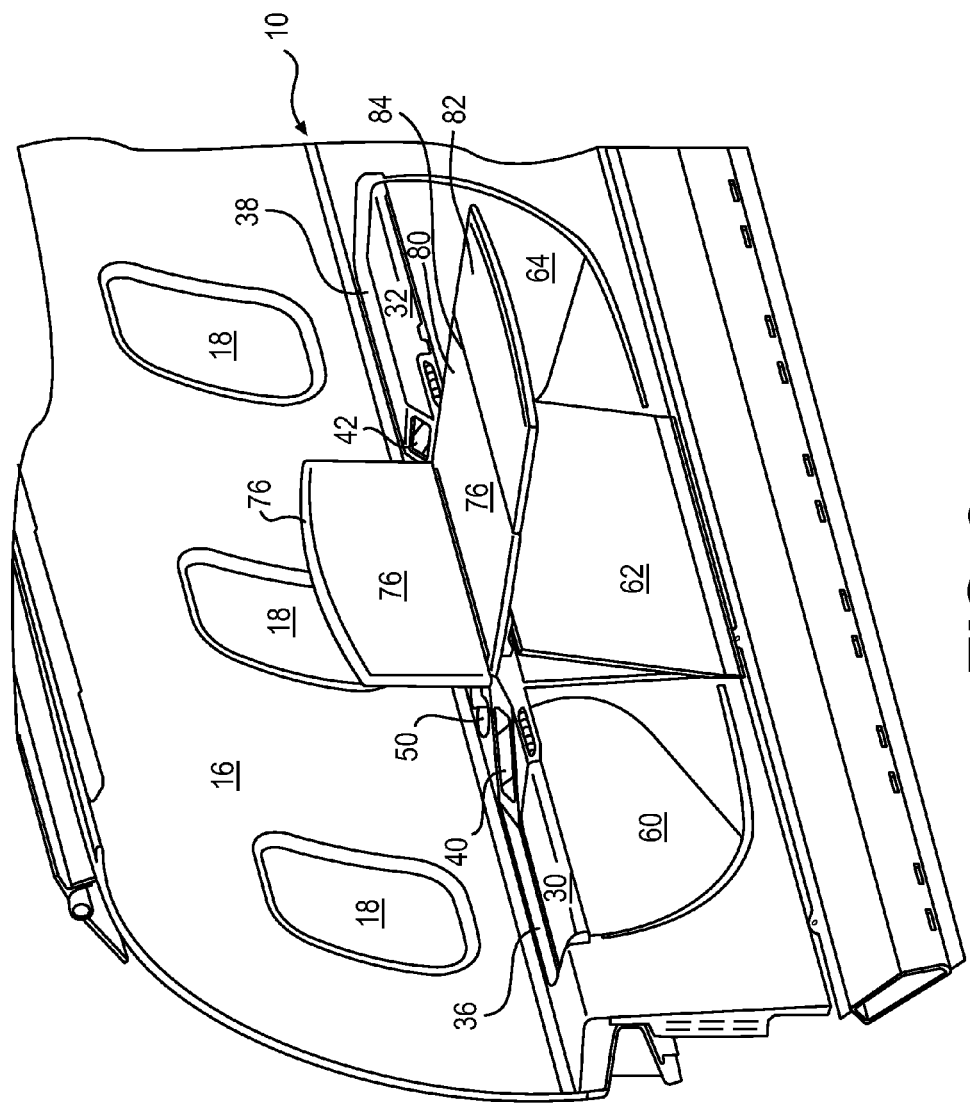
FIG. 8 is a perspective illustration of the embodiment shown in FIG. 7, with the table being shown in a partially deployed and a deployed condition.

In the illustrated embodiment, each cup holder 50, 52 is roughly figure-8 shaped, with one lobe of the shape being slightly larger than the other. In the embodiment shown, the larger lobe 54 is closer to the access panel 48 than the smaller lobe 56. It is contemplated that a two lobe cup holder 50, 52 will be employed in aircraft to accommodate beverage cups and/or containers with different sizes. The cup holder 50, 52 is particularly well suited for circumstances where the passenger has both a glass and a beverage can. The larger lobe 54 may accommodate the passenger's glass while the smaller lobe 56 may accommodate the container (such as an aluminum can, for example) that is dispensed into the glass.

As should be apparent to those skilled in the art, the exact shape and size of the cup holders 50, 52 is not limiting of this aspect of the present invention. Cup holders 50, 52 with any suitable shape and size may be employed without departing from the scope of the present invention.

In addition, the embodiment of the sideboard 10 of the present invention that is illustrated in FIG. 1 includes two cup holders 50, 52. It is noted, however, that the number and position of the cup holders 50, 52 should not be understood to be limiting of the present invention. A larger number of cup holders 50, 52 may be employed without departing from the scope of the present invention.

With continued reference to FIG. 1, the sideboard 10 includes an interior panel 58, which includes a forward panel 60, a central panel 62, and an aft panel 64. The interior panel 58 is contemplated to be positioned in a vertical arrangement and extend vertically downward from the inboard edge of the top surface 14.

While a vertical orientation for the interior panel 58 is contemplated for the illustrated embodiment, the interior panel 58 may be disposed at an angle to the vertical without departing from the scope of the present invention.

The forward panel 60 and the aft panel 64 are contemplated to be fixed in position with respect to the top surface 14. The central panel 62, on the other hand, is designed to tilt inwardly (i.e., toward the centerline of the aircraft) so that a table may be deployed from an interior thereof. The central panel 62 tilts along a pivot axis adjacent to a bottom edge of the central panel 62. So that the central panel 62 may be opened easily, the central panel 62 may be provided with a handle 66 adjacent to a top edge thereof. The deployment of the table is described in greater detail below.

FIG. 1 also illustrates a forward control panel 68 and an aft control panel 70. The control panels 68, 70 are provided above the forward interior panel 60 and the aft interior panel 64, respectively. The control panels 68, 70 may include switches that control the operation of the passenger's seat, the lighting above the passenger's head, and/or or provide a call switch to summon a flight attendant. The control panels 68, 70 may be provided with control over the displays 40, 42. Separately, the control panels 68, 70 might include required lighted indicia such as a fasten-seat belt icon, a no smoking icon, or the like. In other words, the exact construction of the control panels 68, 70 should not be considered as limiting of the present invention.

Figure 2:
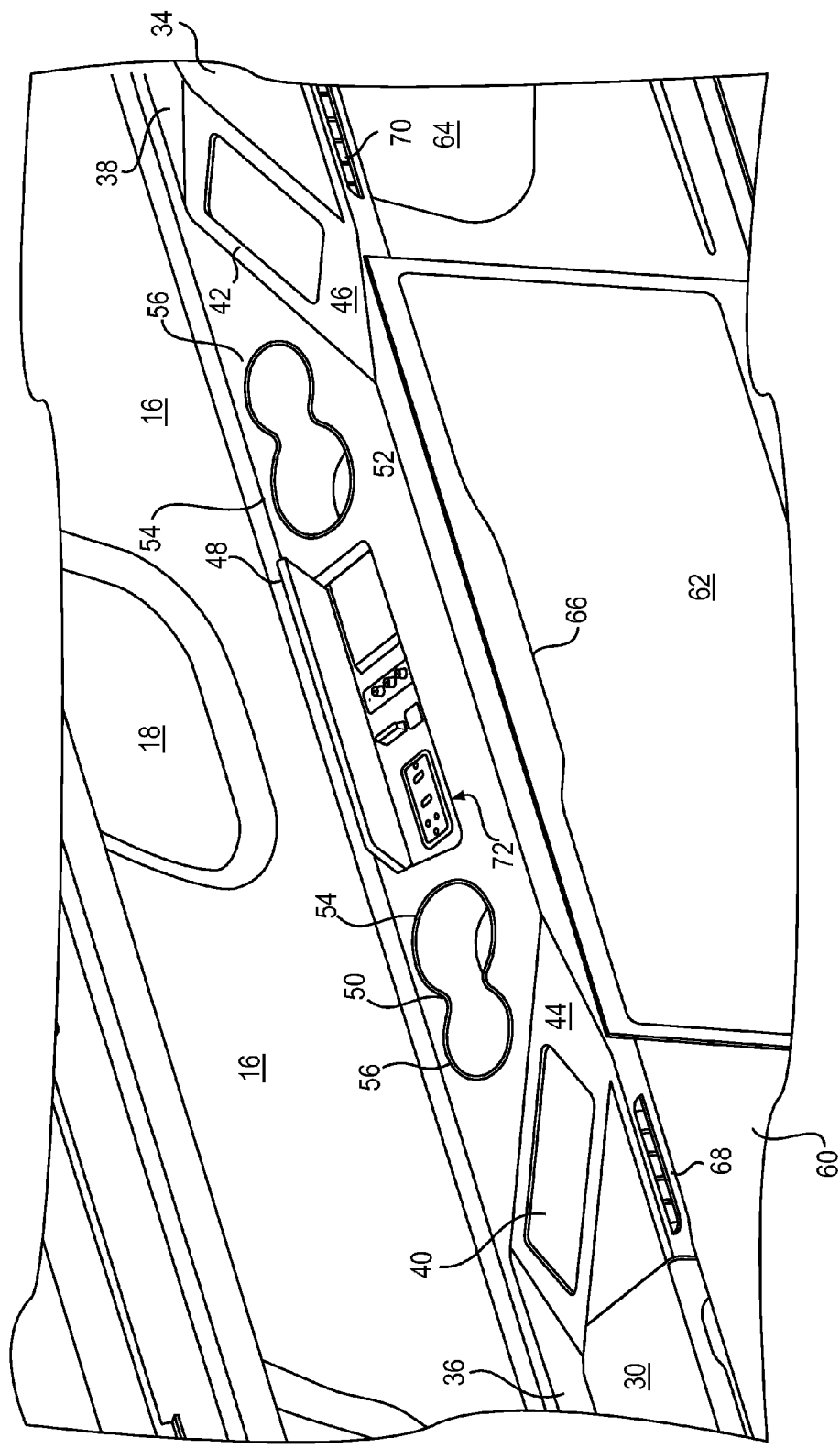
FIG. 2 is an enlarged, perspective illustration of the aircraft interior shown in FIG. 1, showing an access panel on the sideboard in an opened state.

FIG. 2 is an enlarged, perspective view of the sideboard 10 that is illustrated in FIG. 1. In this view, the access panel 48 is shown in an opened condition. In this view, the switches and/or access ports 72 are readily discernible.

Figure 3:
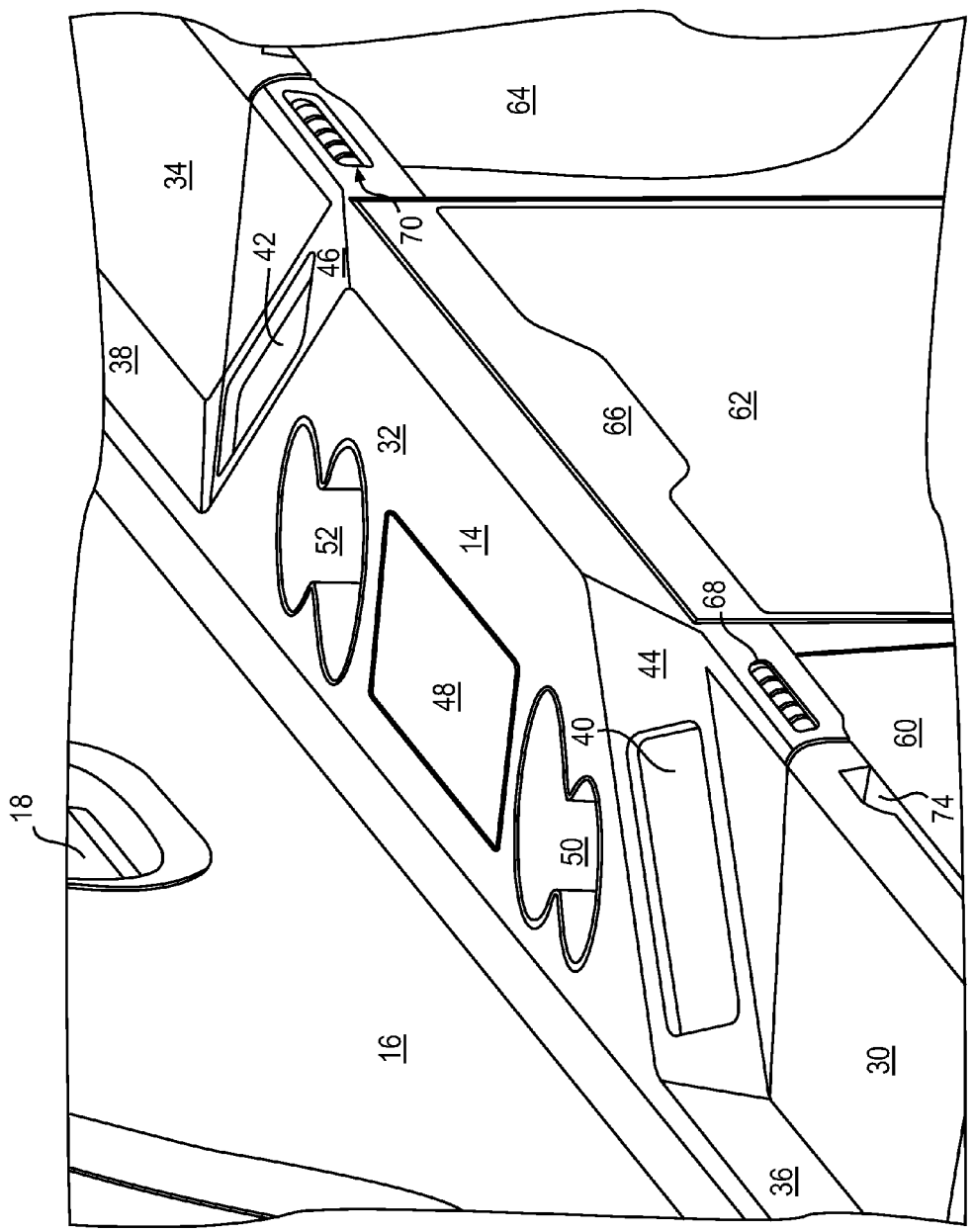
FIG. 3 is an enlarged, perspective illustration of the aircraft interior shown in FIG. 1, showing the access panel on the sideboard in a closed state, with the perspective being taken from a slightly different angle than in the prior figures.

FIG. 3 is a perspective illustration of the top surface 14 of the sideboard 10. In this view, which is taken from a forward position looking toward an aft position, the height difference between the central top surface 32 and the forward top surface 30 is more readily discernible, due in part to the angle of the perspective view.

Figure 4:
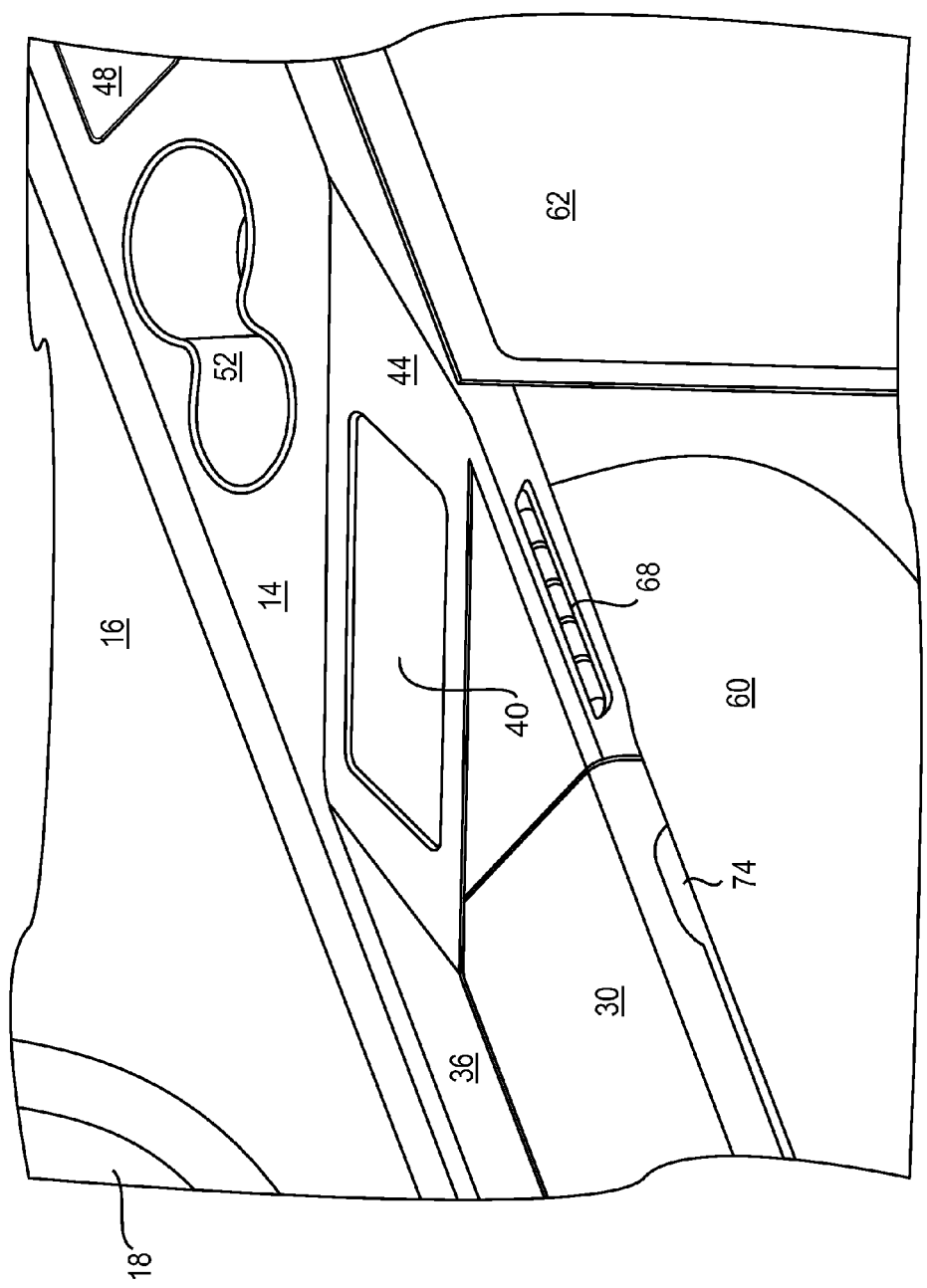
FIG. 4 is an enlarged, perspective detail of one of the display screens that are incorporated into the sideboard of the present invention.

FIG. 4 provides an enlarged, perspective view of the forward portion of the sideboard 10, showing part of the forward top surface 30. As indicated above, the forward top surface 30 need not be integrally molded with the top surface 14 of the sideboard 10. Instead, the forward top surface 30 may be openable to reveal a storage compartment or equipment concealed therebeneath. To assist with opening the forward top surface 30, an opening 74 may be provided in the inboard edge to accommodate a person's finger(s) therein.

Figure 5:
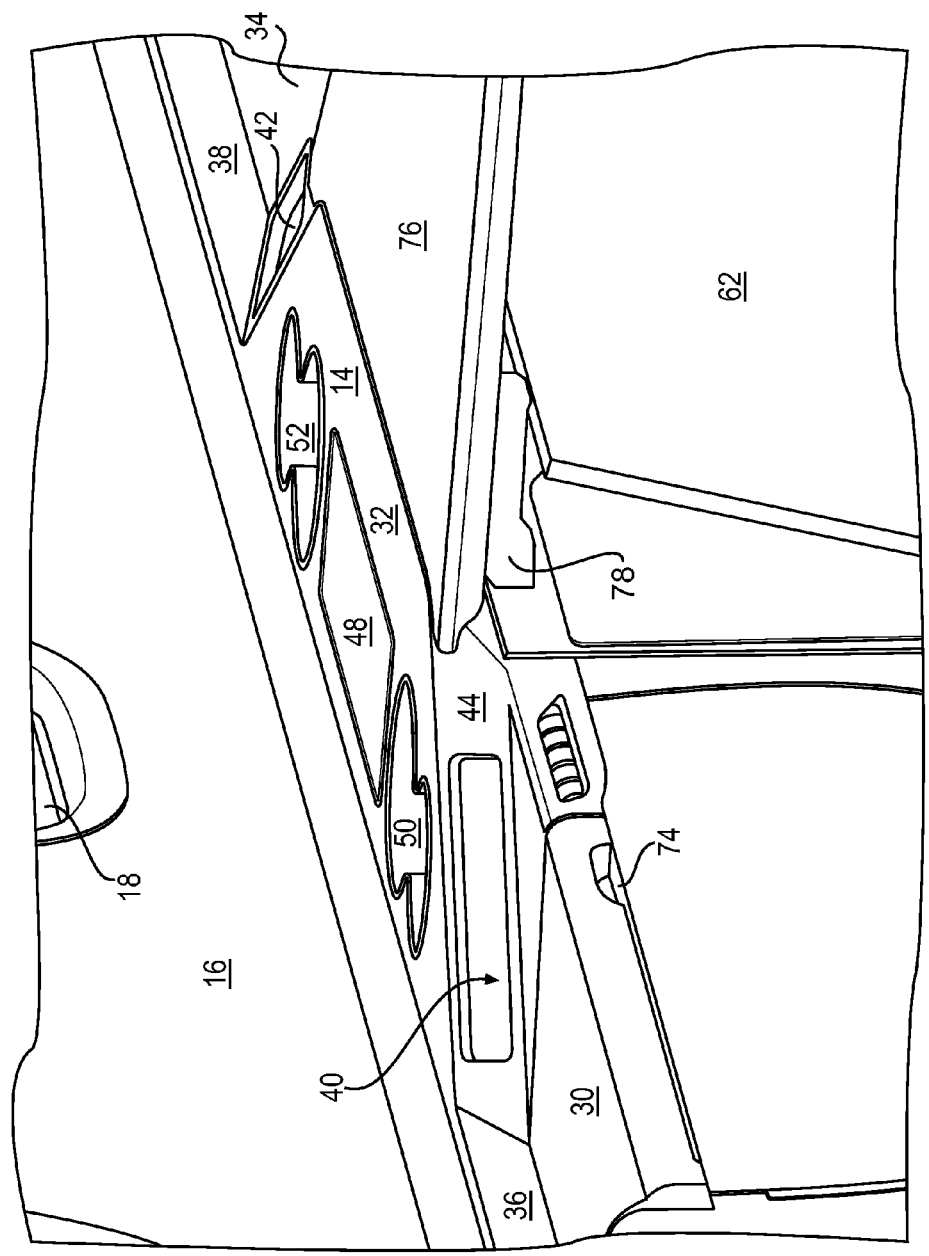
FIG. 5 is a perspective illustration of the sideboard of the present invention, showing a portion of a table in a deployed position.

FIG. 5 is a perspective illustration of the sideboard 10 of the present invention, showing a table 76 in a deployed condition. The table 76 has been deployed from a stowed position behind the central panel 62. As also shown in FIG. 5, a support 78 is contemplated to extend beneath the table 76 to provide stability for the table 76 when in the deployed state. In this view, the central panel 62 is contemplated to remain in a state where the central panel is tilted inboard from its vertical (or closed) position. In the opened position, the central panel 62 is contemplated to expose one or more supports 78 and also provide structural support for the table 76. It is contemplated, however, that the central panel 62 need not support the table 76 to practice the present invention.

Figure 6:
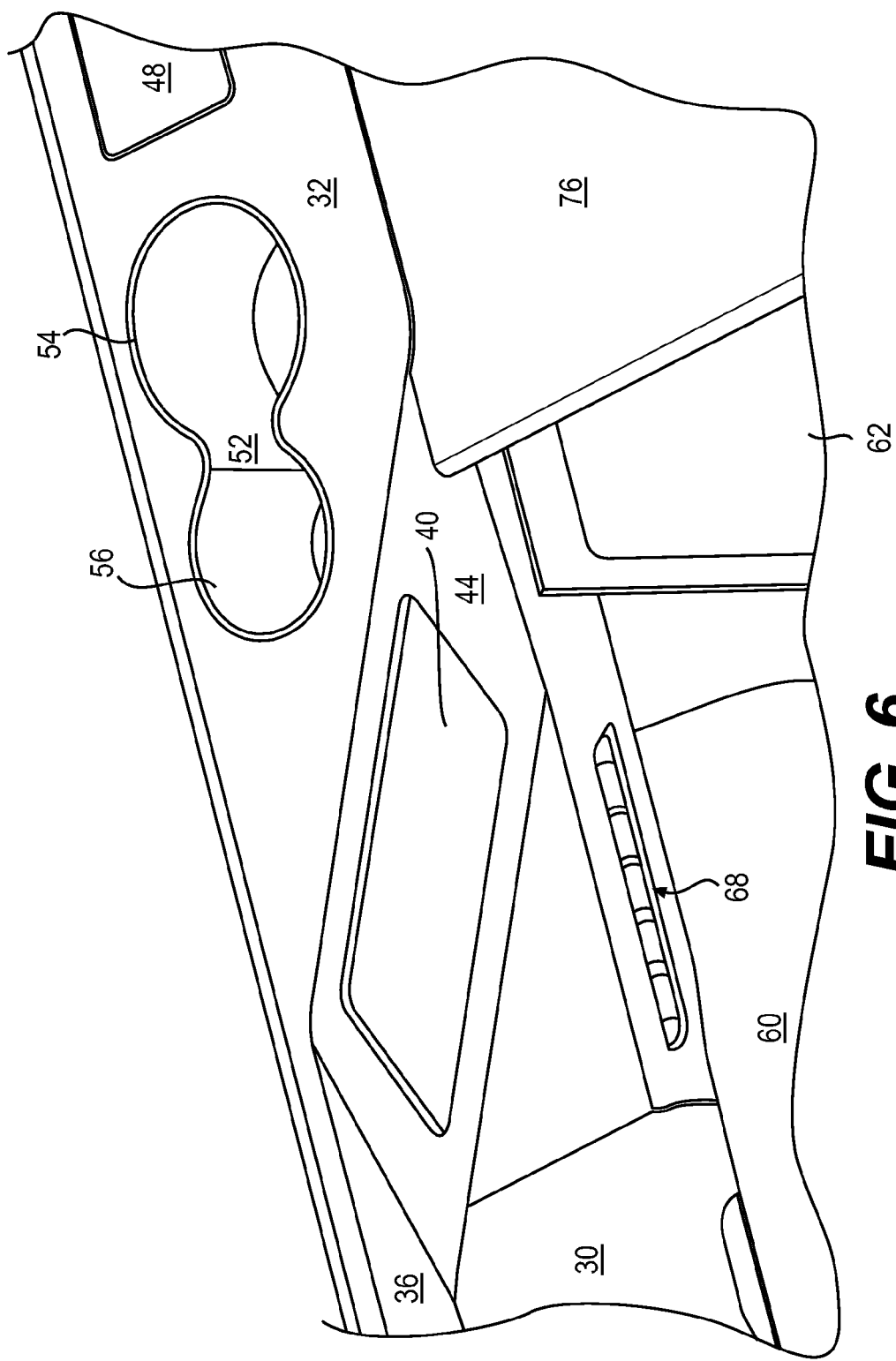
FIG. 6 is a perspective illustration of the configuration shown in FIG. 5, with the table in the deployed position and the perspective being taken from a different angle.

FIG. 6 is an enlarged, perspective view of a portion of the sideboard 10 shown in FIG. 5. As illustrated in this view, the table 76 is contemplated to be flush with the central top surface 32 when the table 76 is in the deployed condition. While a flush construction is contemplated, a flush positioning of the table 76 with respect to the central top surface 32 is not required to practice the present invention.

Figure 7:
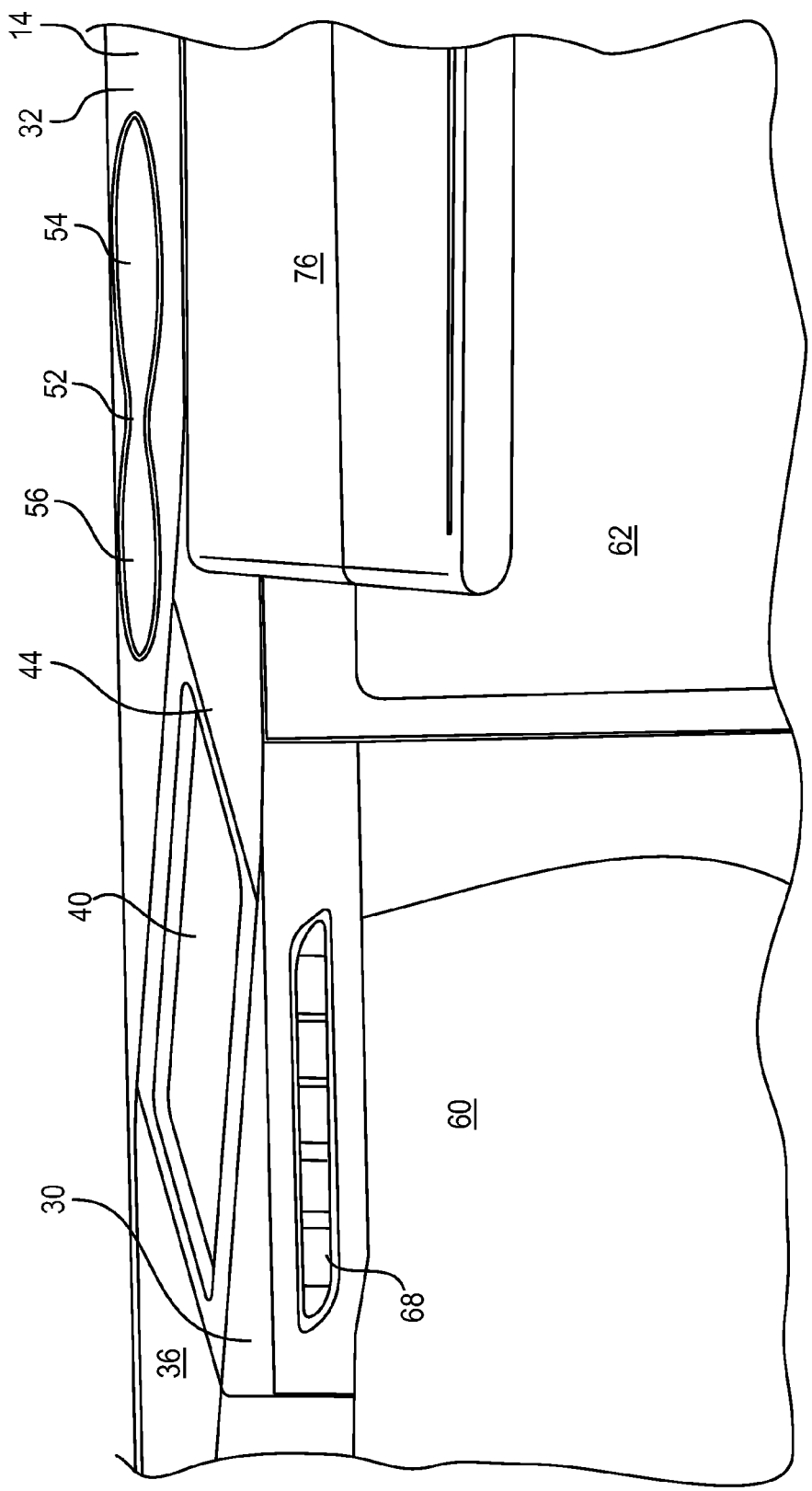
FIG. 7 is a perspective, near-end view of the embodiment illustrated in FIG. 6, with the perspective being taken from a different angle to illustrate still further features and aspects of the present invention.

FIG. 7 is a perspective illustration of the portion of the sideboard 10 shown in FIG. 6, which the perspective being taken from a nearly front view. In this view, the table is shown in its deployed position. This view illustrates the flush association between the table 76 and the central top surface 32. In addition, this view highlights the angled nature of the display panel 40.

FIG. 8 illustrates the table 76 of the present invention, shown in the fully deployed condition where the table 76 establishes a horizontal surface. FIG. 8 also illustrates that the table 76 is made from two leaves 80, 82 that fold against one another along a central line 84 running parallel to the longitudinal axis of the aircraft.

In FIG. 8, to assist with an understanding of the present invention, the table 76 also is shown in a partially deployed condition, just after the table 76 is extracted from the compartment behind the central panel 62. Specifically, when the central panel 62 is opened into the interior of the aircraft, it is slightly inclined with respect to the vertical, closed position. As is apparent from FIG. 8, the panel 62 is slightly tilted toward the floor 120 of the cabin. The table 76, which is initially in a folded state, is extracted vertically from the center panel 62. The table 76 is then pivoted into a horizontal condition, where it is unfolded.

Figure 9:
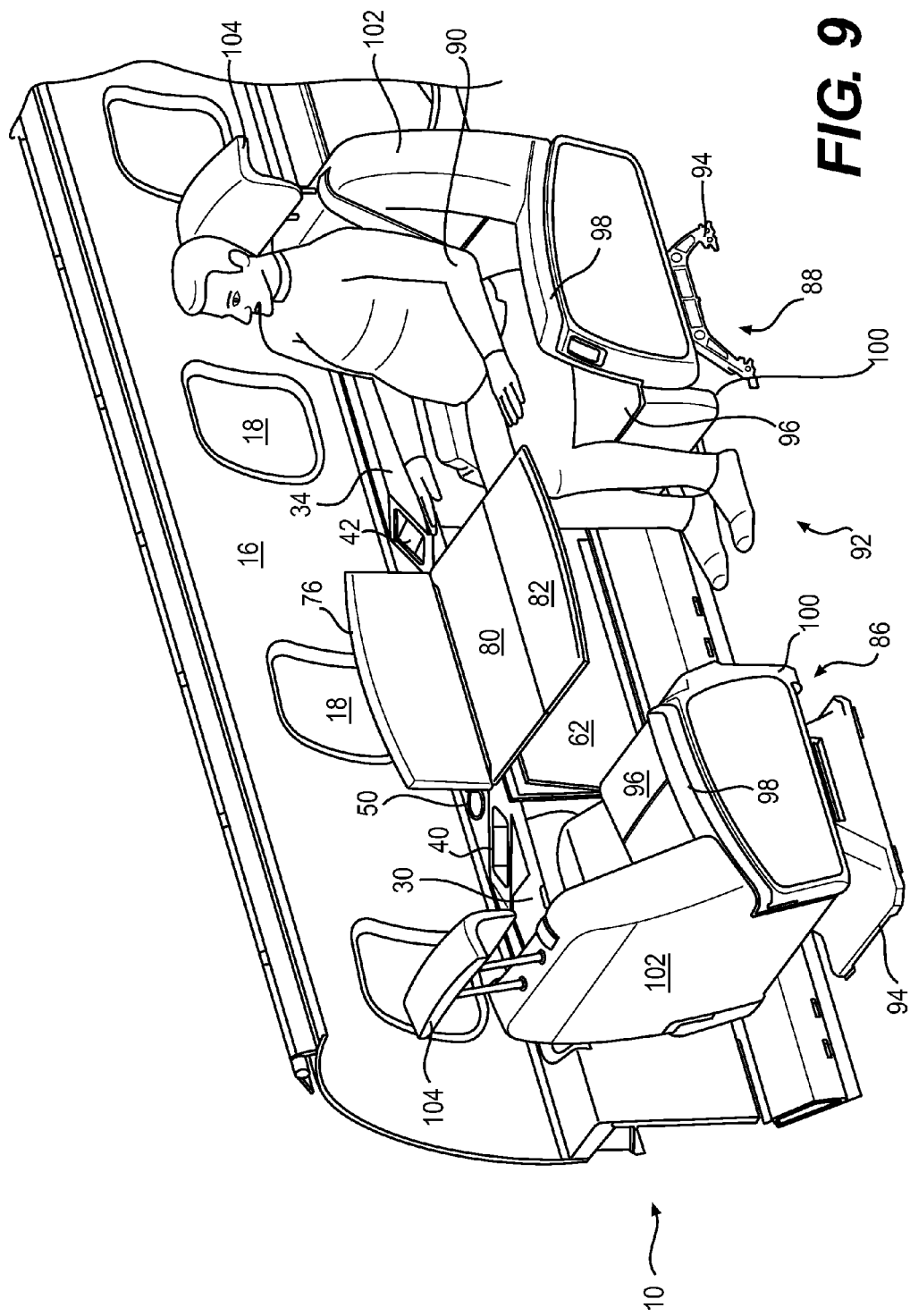
FIG. 9 is a perspective illustration of the sideboard shown in FIG. 8, including an accompanying seating arrangement that defines a seating area in connection with the sideboard.

FIG. 9 is a perspective illustration of the sideboard 10 of the present invention, showing the table 76 in the partially deployed condition and in the fully deployed condition, similar to the view provided in FIG. 8.

FIG. 9 also includes a forward seat 86 and an aft seat 88, with a passenger 90 being shown in the aft seat 88 for context. The forward seat 86 faces the rear (or aft section) of the aircraft. The aft seat 88 faces the front (or forward section) of the aircraft. Together, the seats 86, 88 establish a seating arrangement 92. In one embodiment, the sideboard 10 forms part of the seating arrangement 92 illustrated in FIG. 9. In another embodiment, the table 76, in the deployed condition, is considered to be a part of the seating arrangement 92.

With continued reference to FIG. 9, the seats 86, 88 are contemplated to be mirror images of one another. The seats 86, 88 are attached to the floor 120 of the aircraft cabin via a base 94. As should be apparent to those skilled in the art, the bases 94 of the seats 86, 88 typically are connected to tracks (not shown) in the floor 120 of the aircraft. The seats 86, 88 each include a seat cushion 96 supported on the base 94. Armrests 98 flank either side of the seat cushion 96. The seats 86, 88 include leg rests 100, back rests 102, and headrests 104.

The seating arrangement 92 that is depicted in FIG. 9 represents one contemplated configuration of the seats 86, 88. As illustrated, with the forward seat 86 facing aft and the aft seat 88 facing forward, the seats 86, 88 flank the table 76 so that passengers 90 in each seat 86, 88 have access to the table 76 when it is in the deployed condition. Moreover, the seats 86, 88 face one another.

As should be apparent to those skilled in the art, both of the seats 86, 88 are anticipated to be rotatable through a full 180° (or more). As a result, the forward seat 86 may be rotated to face forward and the aft seat 88 may be rotated to face the aft section of the aircraft.

Figure 10:
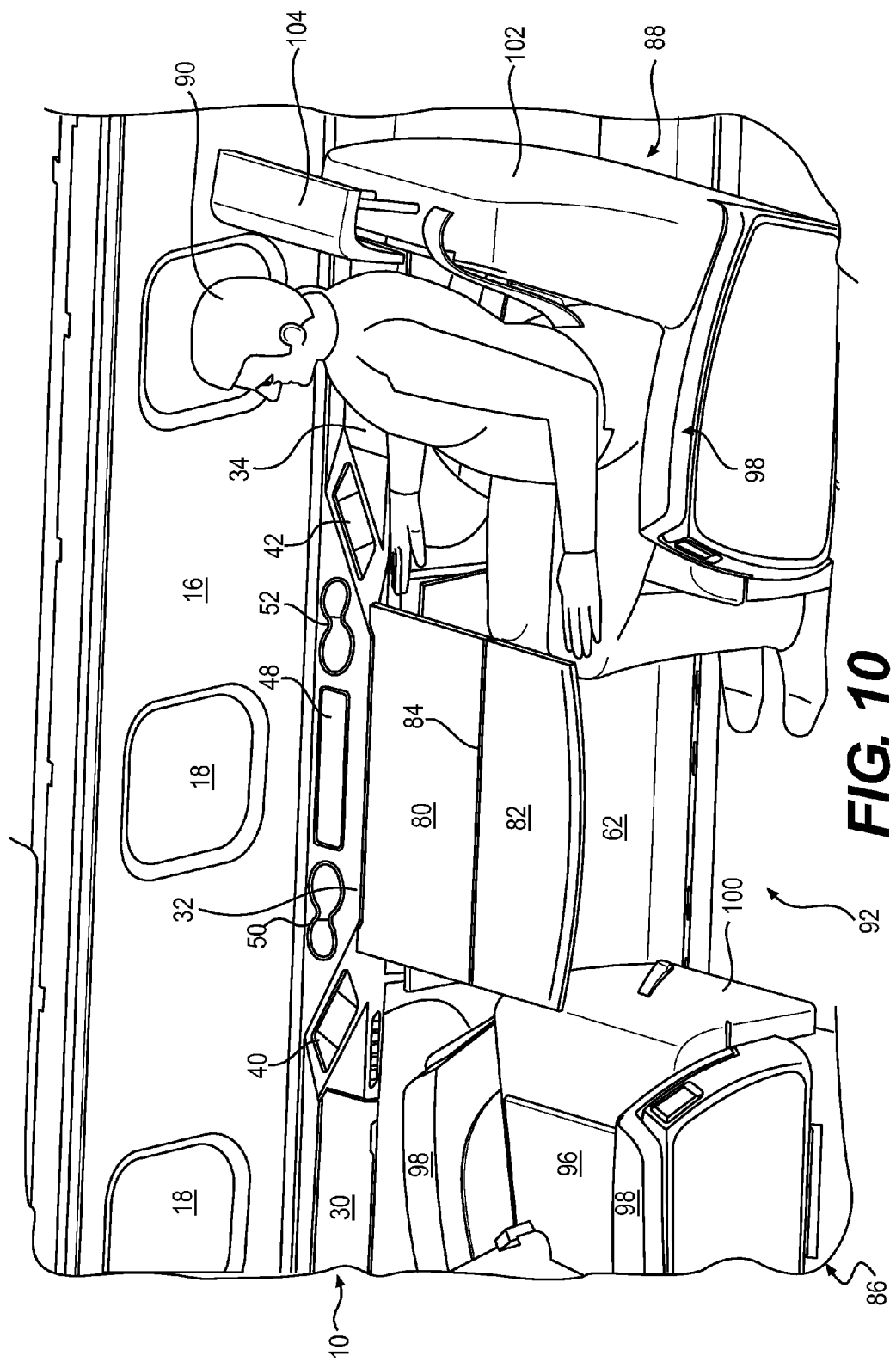
FIG. 10 is a perspective illustration of the sideboard of the present invention as shown in FIG. 9, also showing seats in one possible seating configuration.

FIG. 10 is an enlarged, perspective view of the seating arrangement 92 that is illustrated in FIG. 9. The perspective provides additional details concerning the seating arrangement 92. Moreover, the table 76 is illustrated in the deployed condition.

Figure 11:
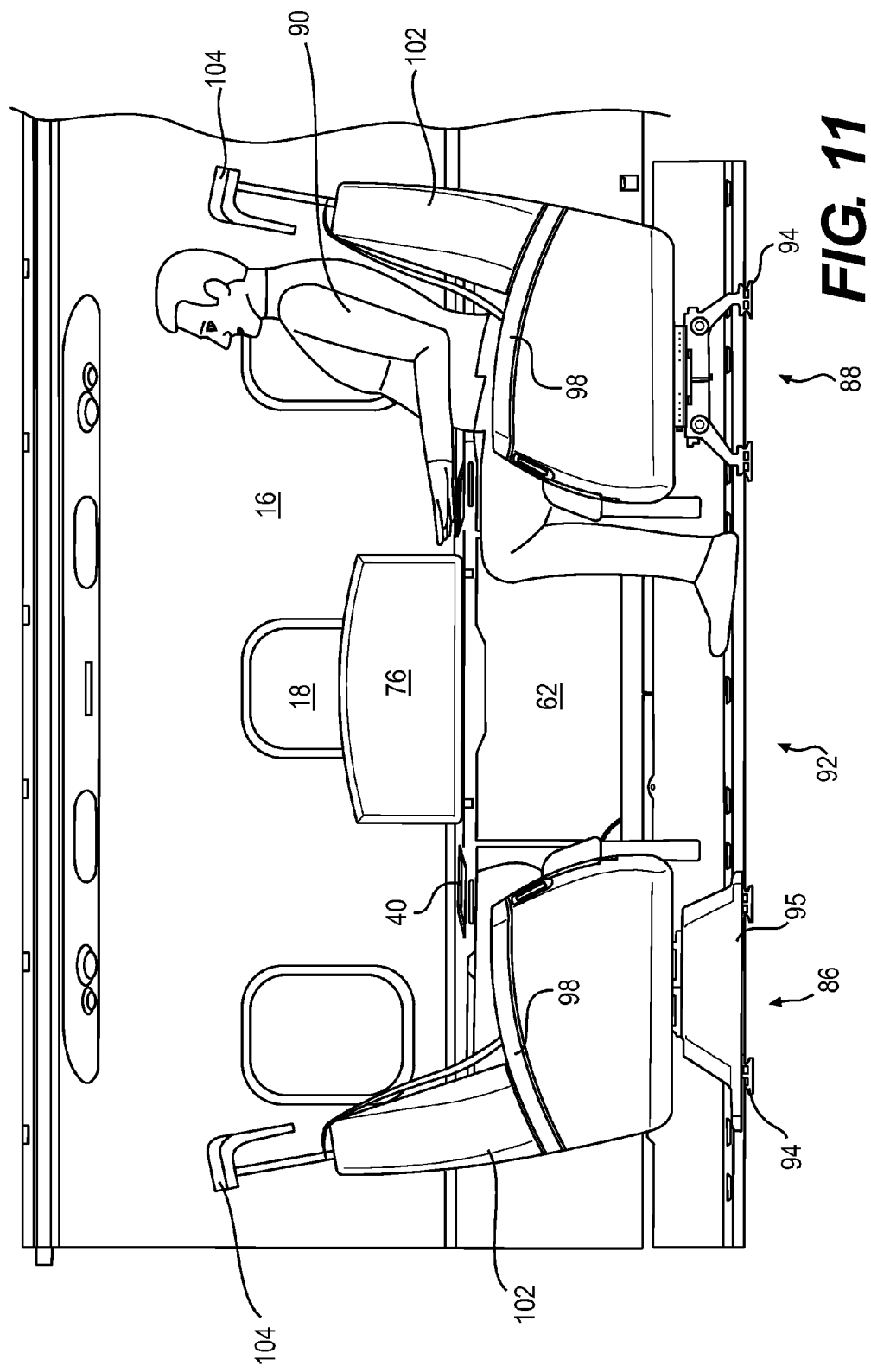
FIG. 11 is a front view of the sideboard and seating arrangement of the present invention, with the table being shown in a partially deployed condition.

FIG. 11 is a front view of the seating arrangement 92 that is depicted in FIGS. 9 and 10. The table 76 is shown in the partially deployed condition, as shown in FIG. 9.

FIG. 11 also illustrates alternative arrangements for the base 94 for the seats 86, 88. In particular, the base 94 of the forward seat 86 includes a cover 95, which covers the frame 97 that forms the base 94 of the forward seat 86. The cover 95 is excluded from the aft seat 88, for illustrative purposes. The cover 95 is contemplated to provide a more aesthetically pleasing appearance for the base 94 of the seat 86, as should be apparent to those skilled in the art. The cover 95, however, may be excluded, as illustrated for the aft seat 88 without departing from the scope of the present invention.

Figure 12:
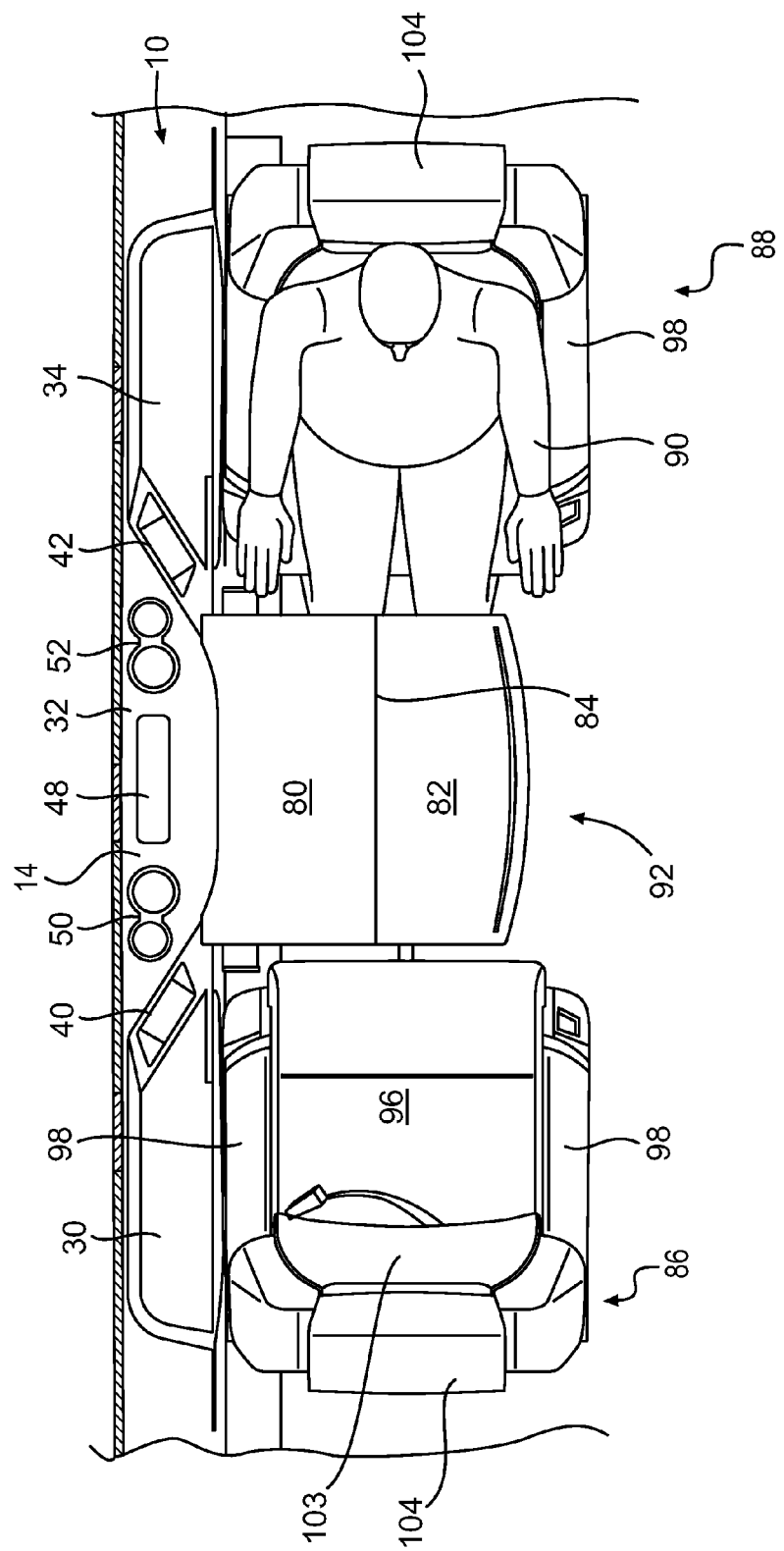
FIG. 12 is a top view of the sideboard and seating arrangement of the present invention, with the table being shown in a deployed condition.

FIG. 12 is a top view of the seating arrangement 92. As in prior views, the seats 86, 88 face one another across the table 76.

Figure 13:
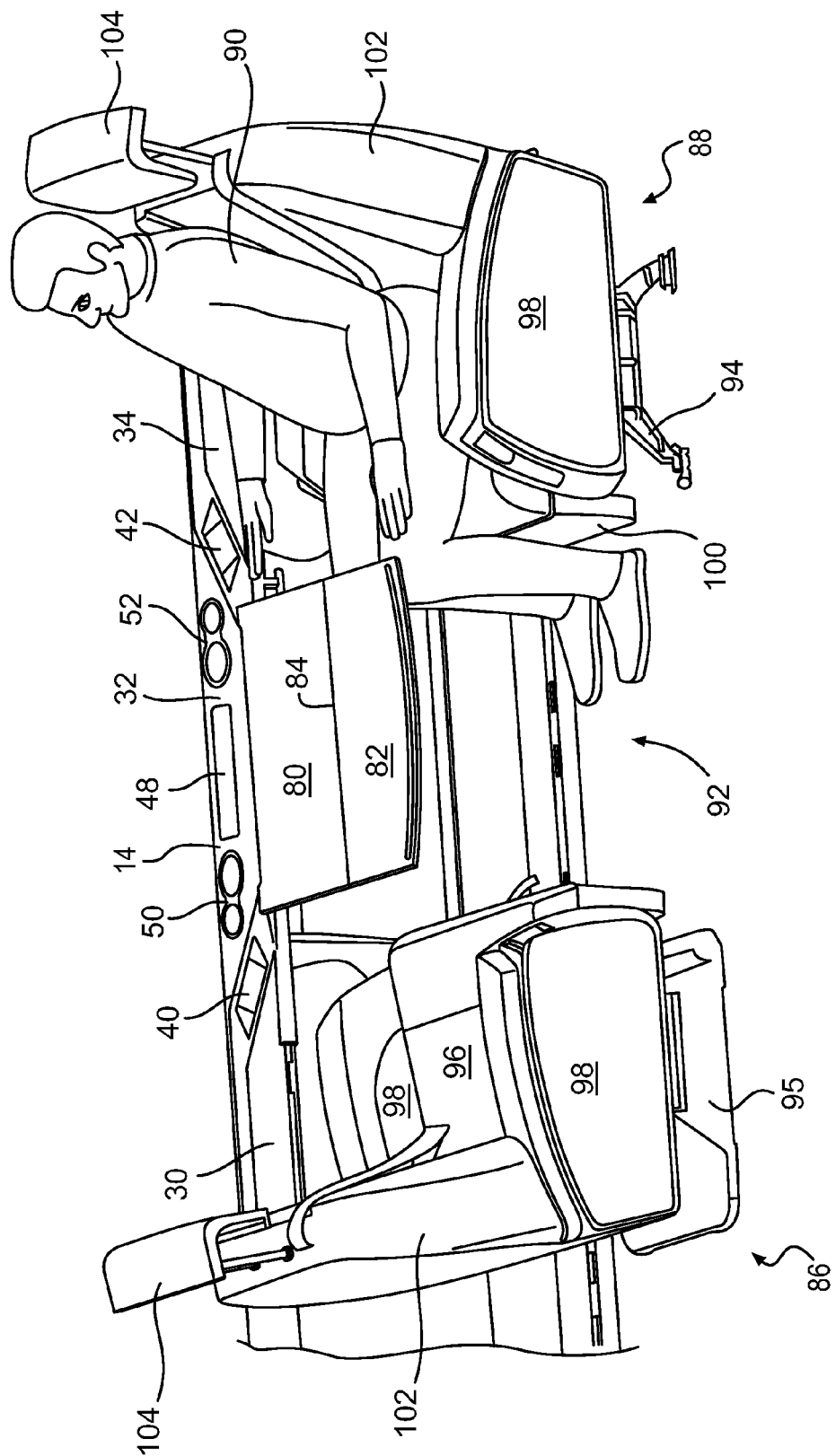
FIG. 13 is a perspective illustration of the sideboard and seating arrangement of the present invention, showing the configuration illustrated in FIG. 12.

FIG. 13 is a perspective illustration of the seating arrangement 92 that is shown in FIG. 12, among other figures.

Figure 14:
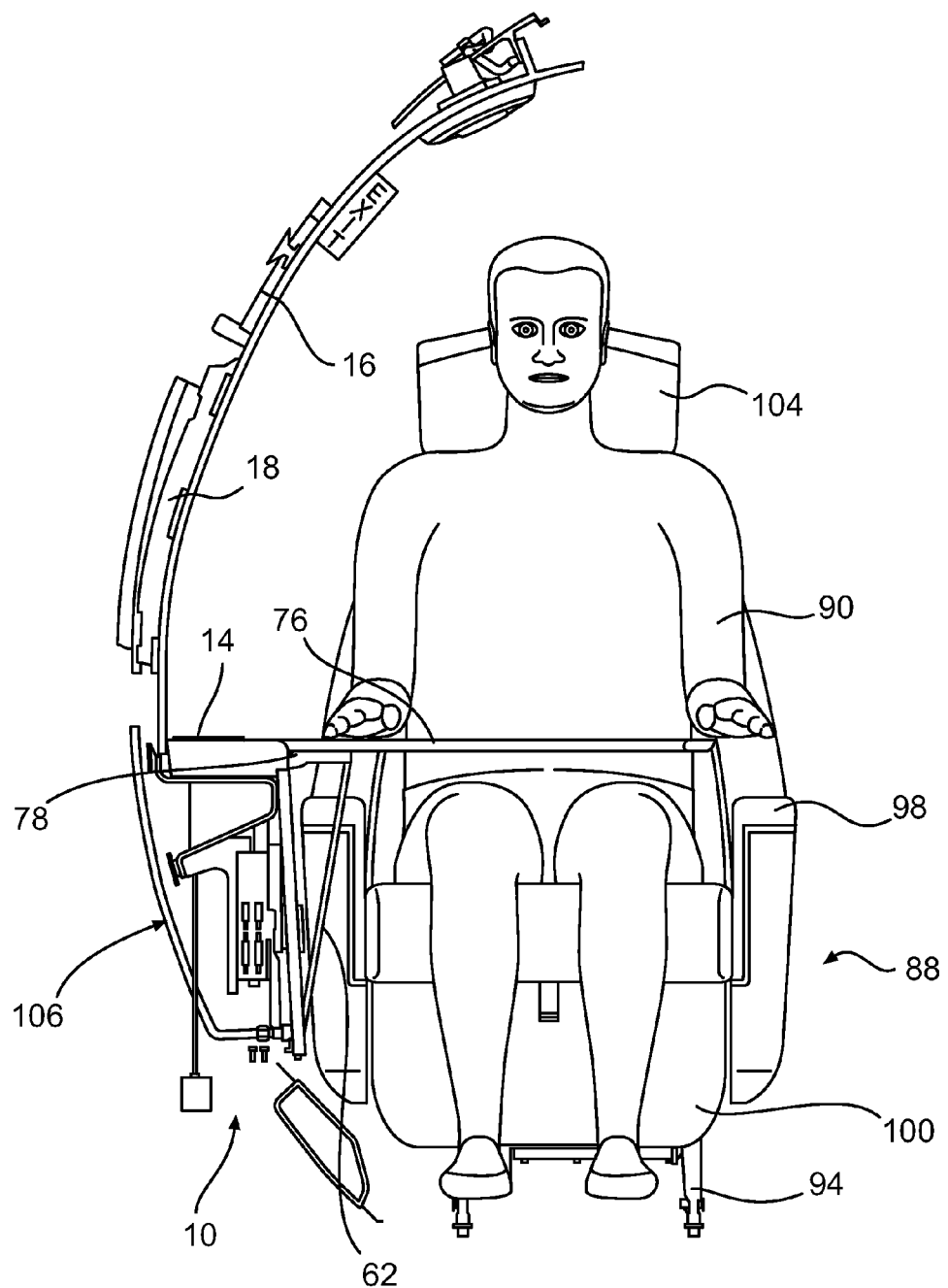
FIG. 14 is a cross-sectional illustration of the sideboard and seating arrangement of the present invention.

FIG. 14 is an end view of the sideboard 10, including the aft seat 88. The table 76 is shown in the deployed condition in this end view of the sideboard 10. In this view, the center panel 62 is shown in the tilted position, which permits the table 76 to be extracted from the sideboard 10. The mechanism 106 that permits the table 76 to be stowed and deployed from within the sideboard 10 is shown in general detail.

Figure 15:
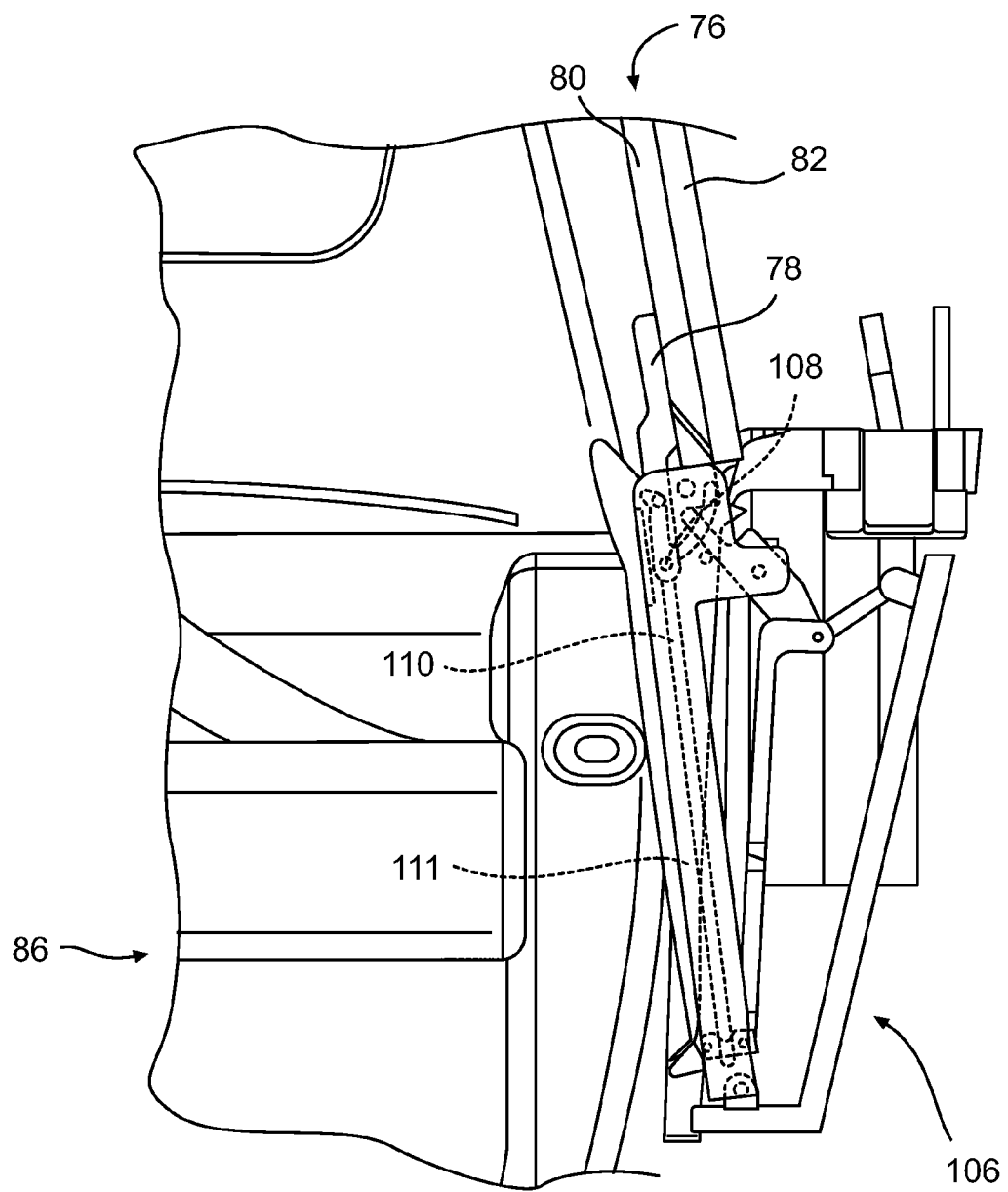
FIG. 15 is an enlarged, end view of components of the table stowable within the sideboard of the present invention.

FIG. 15 is an enlarged, end view of one embodiment of the mechanism 106 that permits the table 76 to be stowed in the sideboard 10 and to be deployed from the sideboard 10. The table 76, which includes the leaves 80, 82, is pivotally and slidingly disposed, at a pivot point 108 in a track 110. The track 110 is defined by a rail 111 disposed at a position just inside of the central panel 62, which is shown in the opened position. As discussed above, the central panel 62 tilts inwardly from the sideboard 10 to permit deployment of the table 76. The leaf 80 is connected to a support 78 that provides additional rigidity to the table 76 when in the deployed condition, as discussed above.

Figure 16:
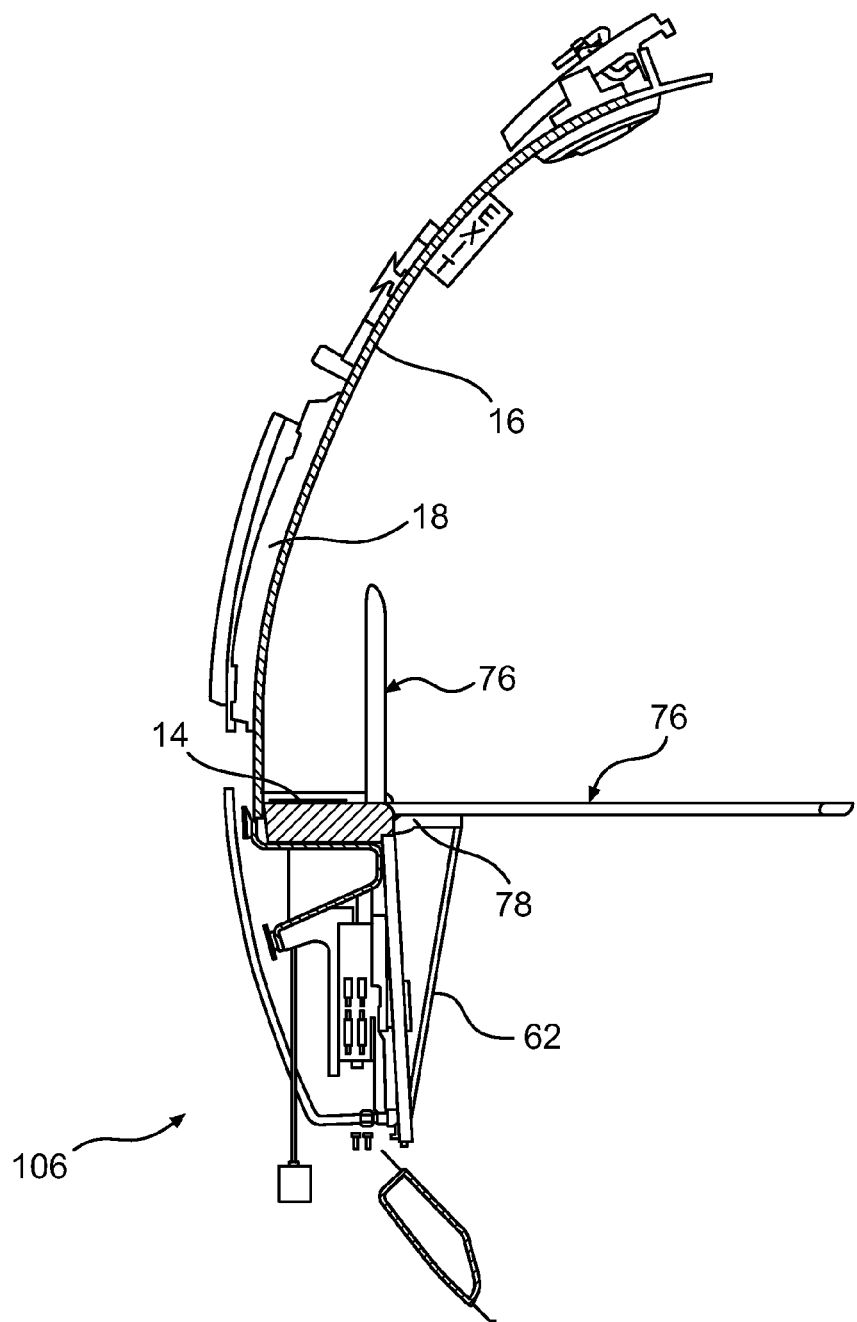
FIG. 16 is an end view of the table of the present invention being shown in a deployed condition.

FIG. 16 is an end view of the table 76, shown in the deployed condition from the sideboard 10. As is apparent from this view, among others, the center panel 62 is tilted outwardly and may be relied upon to support the leaf 80 that is closest to the sidewall 16 of the aircraft. The support 78 that adds rigidity to the table 76 is also shown in the deployed condition.

Figure 17:
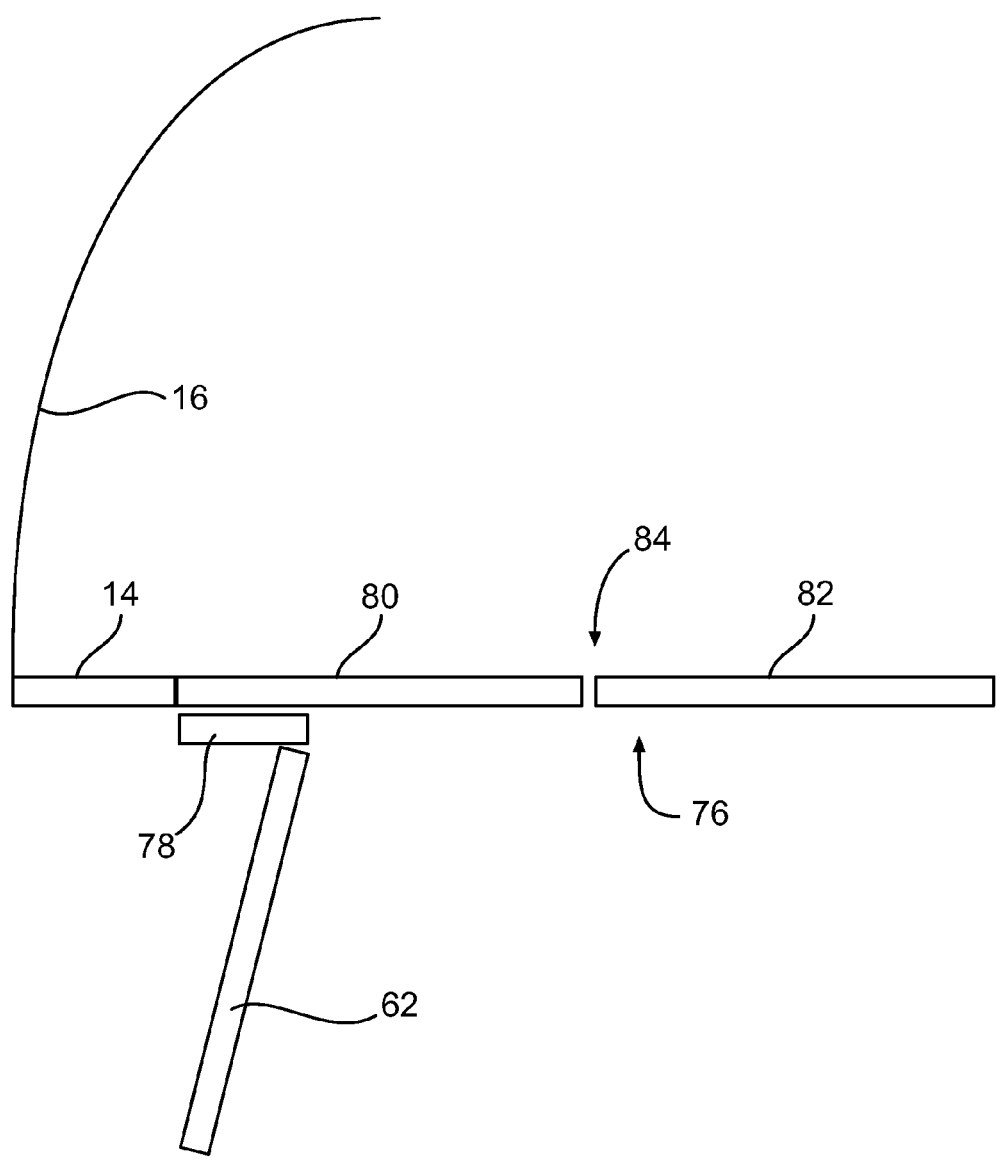
FIG. 17 is a graphical representation of the table shown in FIG. 16, showing selected components of the table in the deployed condition.

FIG. 17 is an end, graphical view, illustrating various aspects of the table 76 of the present invention, where the table is shown in the deployed condition. The sidewall 16 of the aircraft is shown for context. As discussed above, the center panel 62 and the supports 78 contribute to the stability and rigidity of the table 76 when in the deployed condition.

Figure 18:
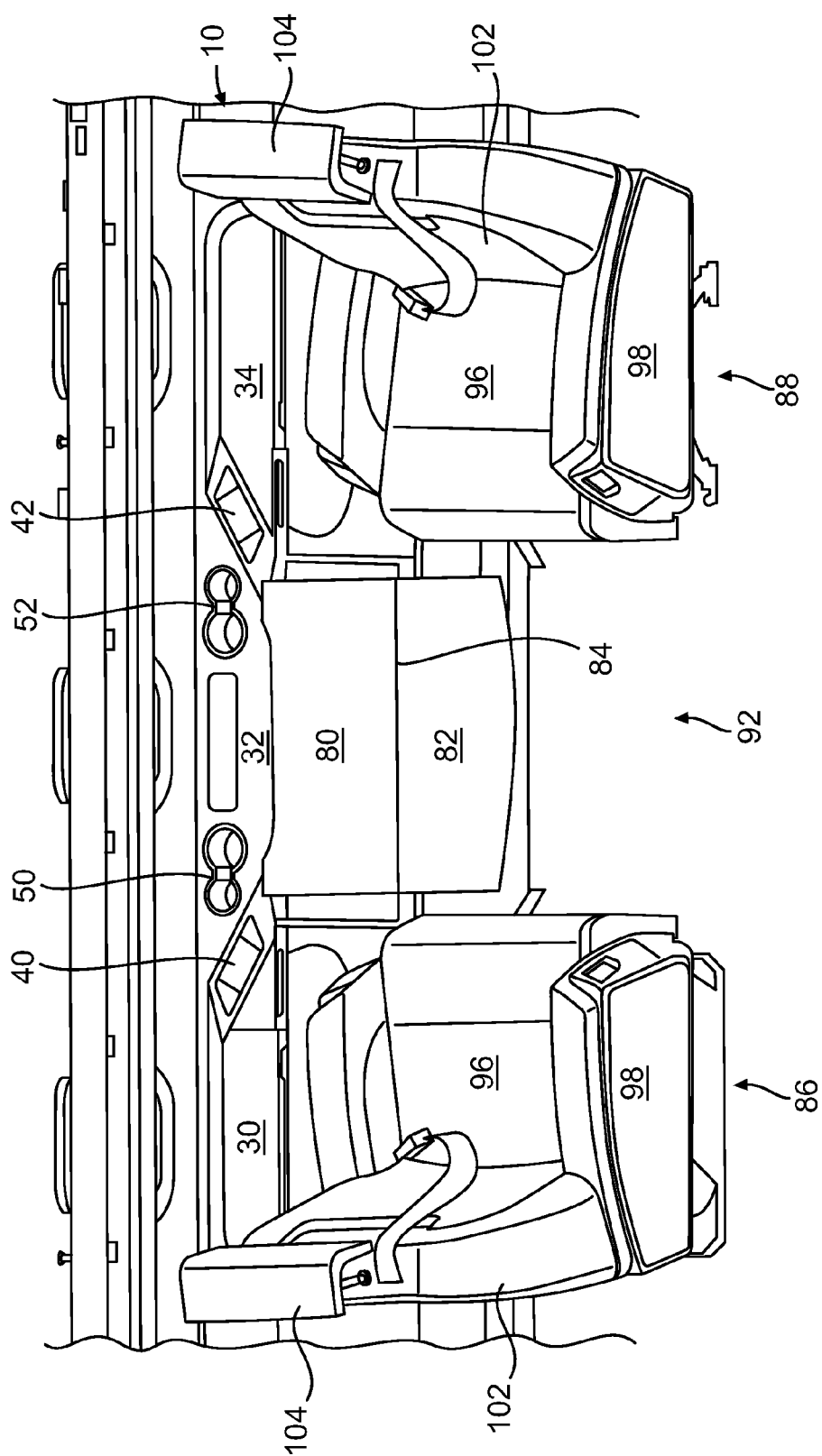
FIG. 18 is a perspective illustration of the sideboard and seating arrangement of the present invention, showing the table in a deployed condition.

FIG. 18 is a perspective illustration of the seating arrangement 92 of the present invention, showing the table 76 in the deployed condition.

Figure 19:
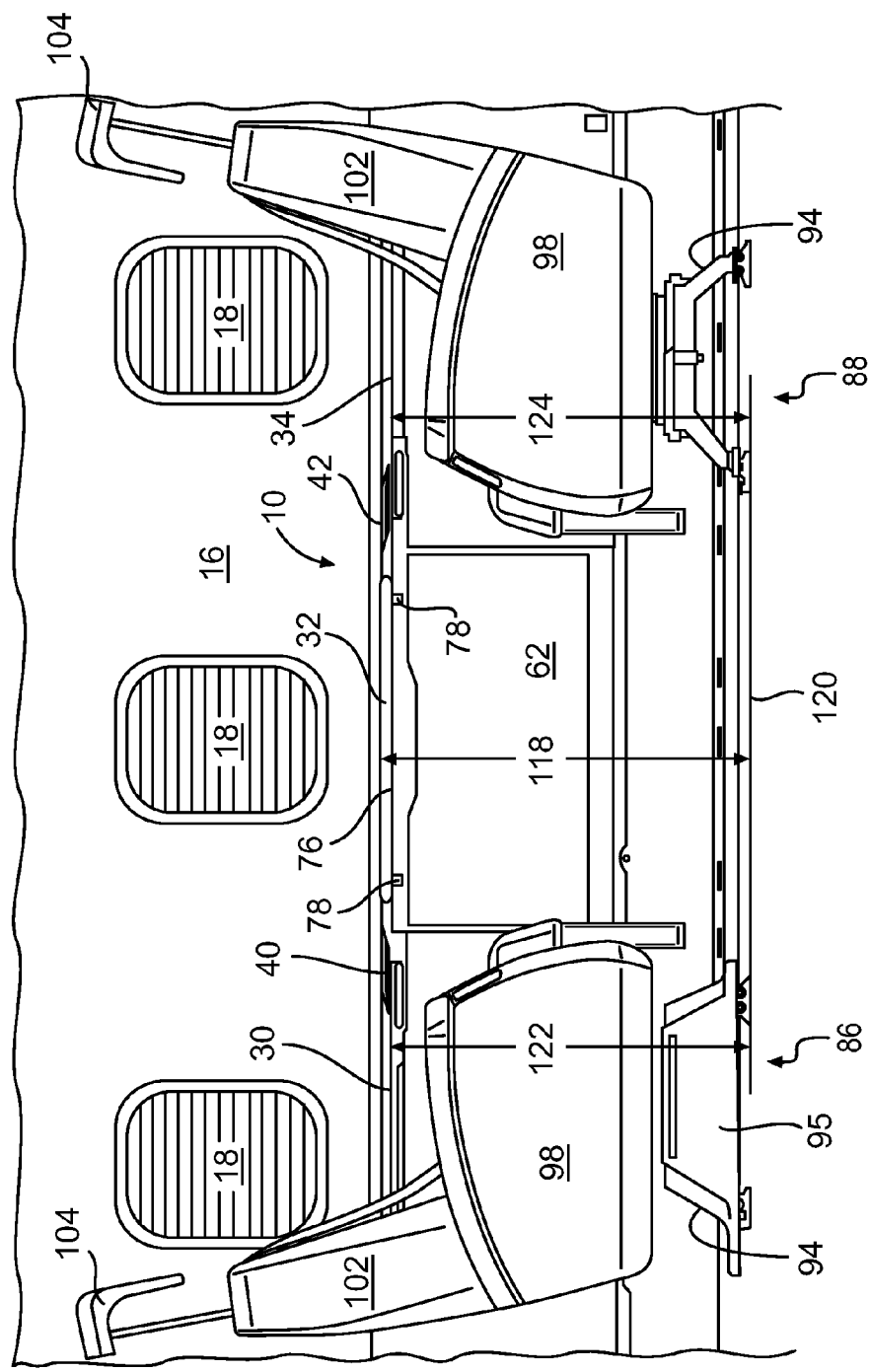
FIG. 19 is a front view of the sideboard and seating arrangement illustrated in FIG. 18.

FIG. 19 is a front view of the seating arrangement illustrated in FIG. 18.

Figure 20:
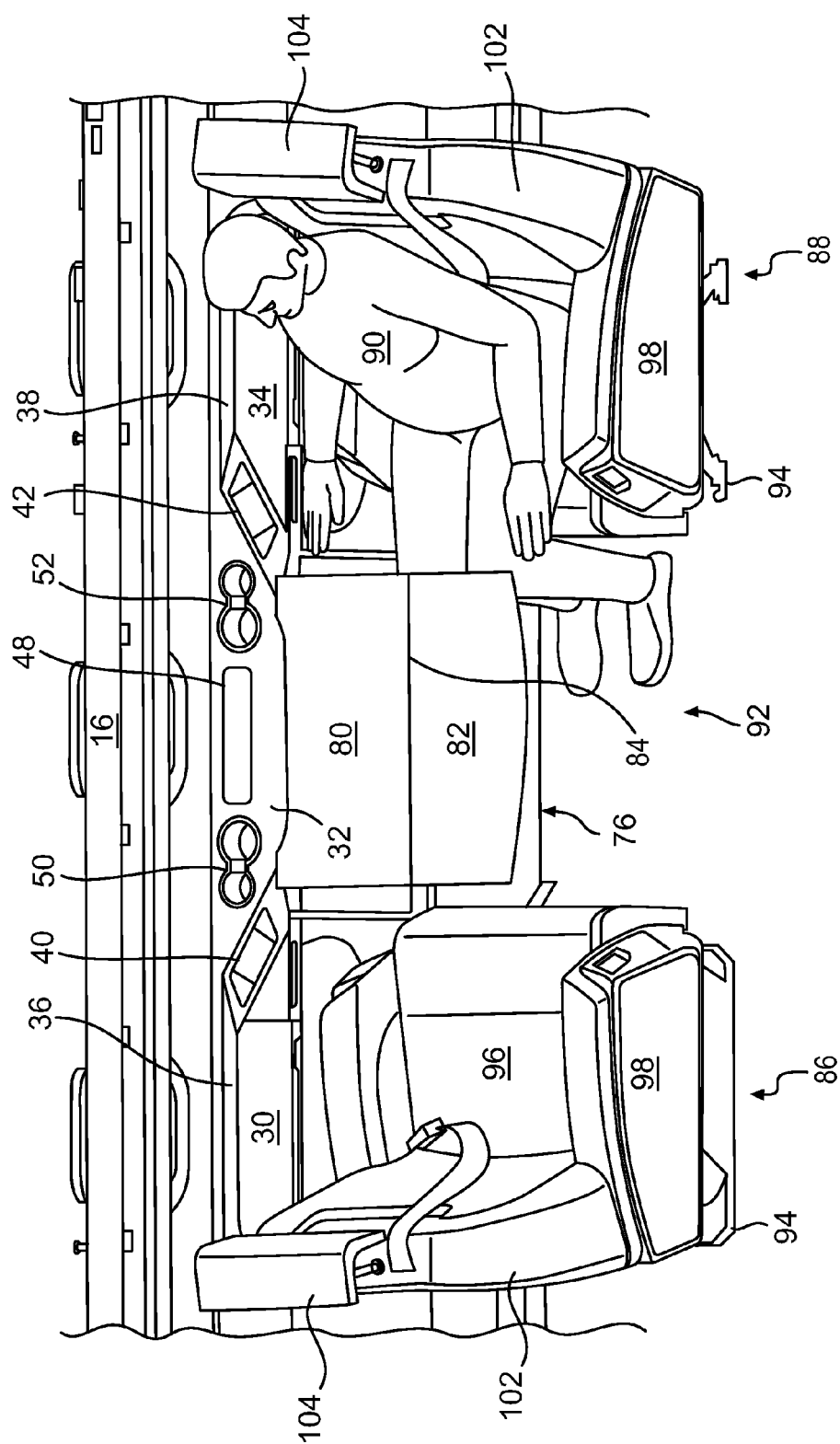
FIG. 20 is a nearly top view of the sideboard and seating arrangement of the present invention.

FIG. 20 is a perspective illustration of the seating arrangement depicted in FIG. 18, including a representative passenger, which is provided for context.

Figure 21:
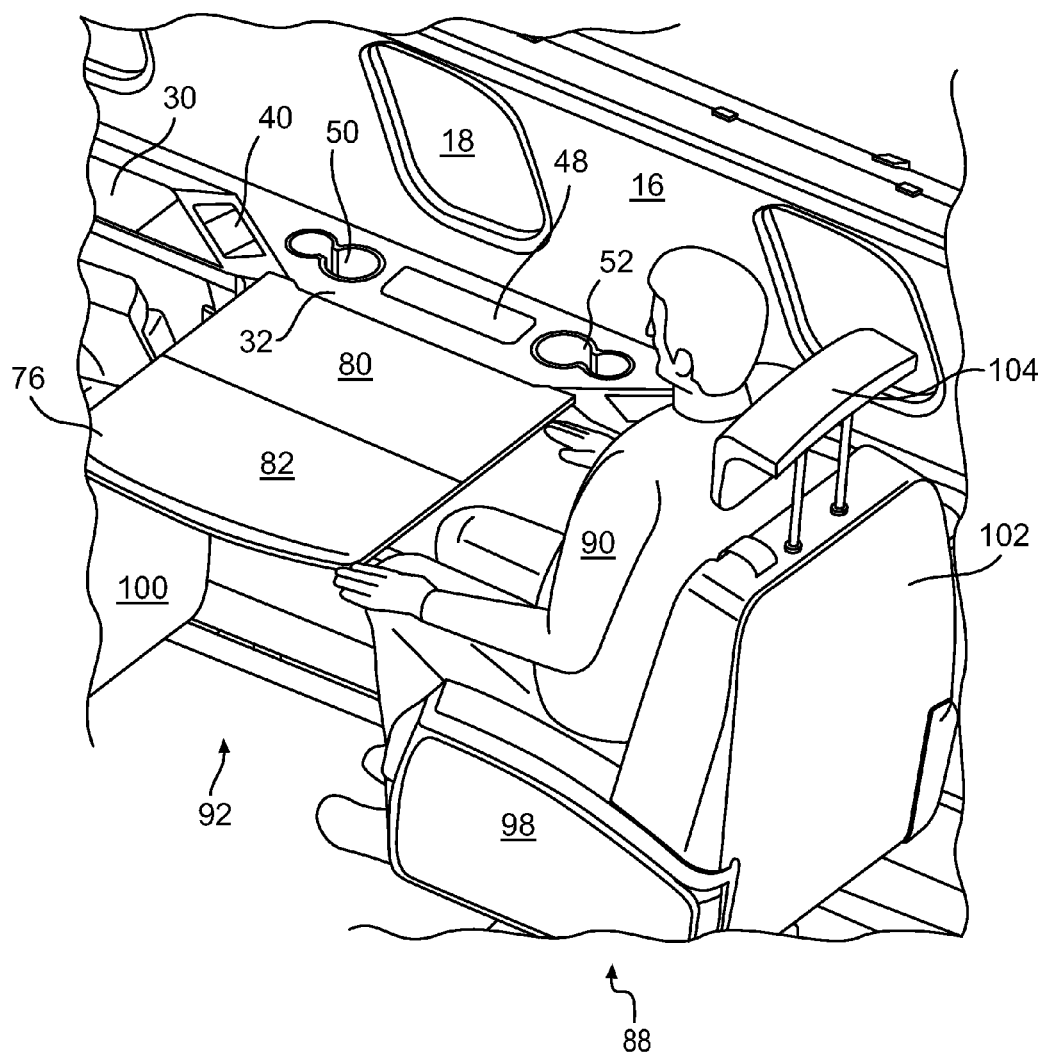
FIG. 21 is a perspective illustration of the sideboard and seating arrangement of the present invention, with the view being taken from a position behind a passenger.

FIG. 21 is another perspective illustration of the seating arrangement 92 of the present invention.

Figure 22:
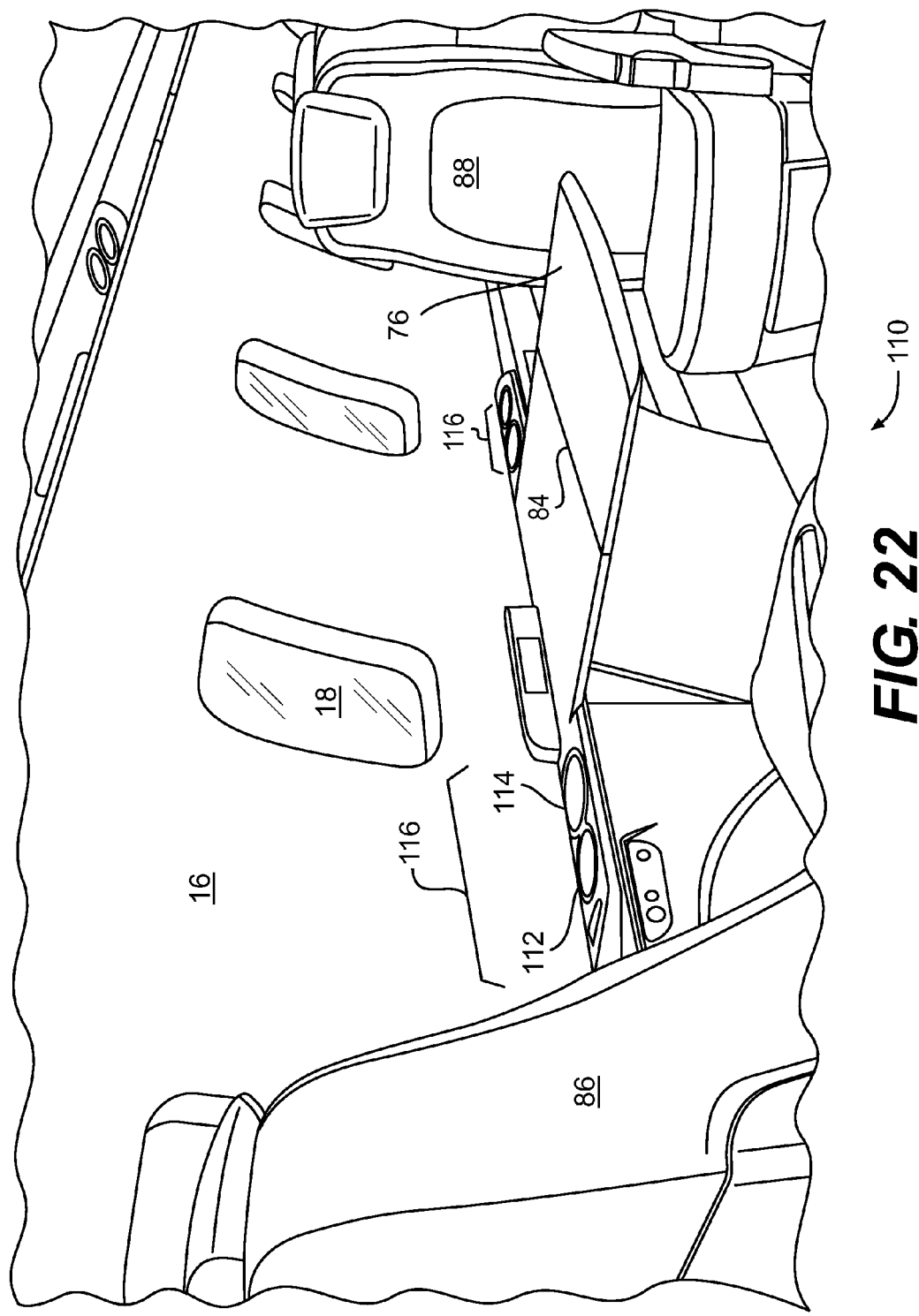
FIG. 22 is a perspective illustration of an additional contemplated embodiment of the sideboard and seating arrangement of the present invention.

FIG. 22 is a perspective illustration of another contemplated embodiment of an aircraft interior 110 according to the present invention. In this embodiment, the forward cup holder 50 is replaced with first and second cup holders 112, 114. Together, the cup holders 112, 114 may be considered a single, double cup holder 116 for purposes of the present invention.

With renewed reference to FIG. 19, and as discussed above, the central top surface 30 is disposed at a first height 118 from the floor 120. The forward top surface 30 is disposed a second height 122 from the floor 120. The aft top surface 34 is disposed a third height 124 from the floor 120. In the illustrated embodiments, the first height 118 is greater than both the second height 122 and the third height 124. In addition, the second height 122 is substantially equal to the third height 124. As should be apparent, the second height 122 need not be equal to the third height 124 to practice the present invention. The third height 124 may be higher or lower than the second height 122 without departing from the scope of the present invention.

As should be apparent from the foregoing, the forward display panel angled surface 44 is a part of the forward transition region 36. The forward transition region 36 provides a transition between the first height 118 of the central top surface 32 and the second height 122 of the forward top surface 30. Similarly, the aft display panel angled surface 46 is a part of the aft display panel angled region 38. The aft transition region 38 provides a transition between the first height 118 of the central top surface 32 and the third height 124 of the aft top surface 34. While both the forward transition region 36 and the aft transition region 38 are generally trapezoidal in shape, any suitable shape may be employed without departing from the scope of the present invention.

As also should be apparent from FIG. 19, the top of the table 76 is at substantially the same height as the central top surface 32. In other words, it is contemplated that the table 76, when in the deployed condition, will be at the first height 118 so that the surface of the table 76 is flush with the central top surface 32.

As should be apparent from the foregoing, the sideboard 10 of the present invention is constructed so that the table 76 may be deployed without the need for lifting the central top surface 32. In other words, the central top surface 32 remains stationary when the table 76 is deployed from the sideboard 10. This offers an advantage to passengers 90 who may have placed items (such as drinks in the cup holders 50, 52) onto the central top surface 32. In this embodiment, the central top surface 32 is immobile, thereby providing a solid surface onto which personal items may be disposed while the table 76 is deployed or stowed.

Reference is now made to FIGS. 23-27, all of which are end views of the sideboard 10. These views provide a simplistic overview of the deployment of the table 76 from the sideboard 10. In these views, the deployment of the table 76 is illustrated without reference to any particular mechanical componentry that is understood to be employed therewith. The mechanical componentry is omitted, because (while depicted in other drawings) the exact structure of the mechanical componentry is not critical to operation of the present invention.

Figure 23:
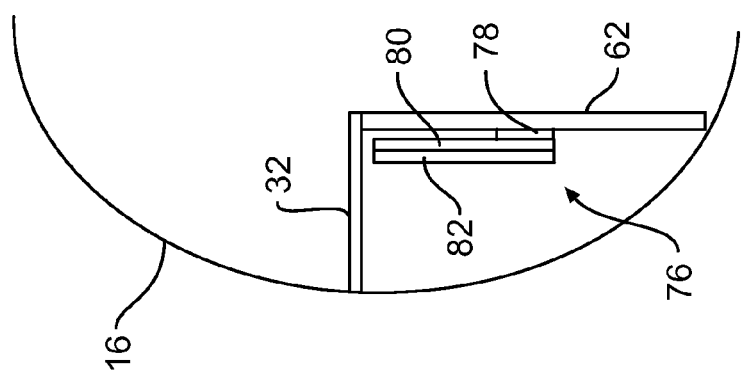
FIG. 23 is a graphical, end view of the sideboard of the present invention, illustrating a stowed condition of the table forming a part thereof.

FIG. 23 illustrates the sideboard 10 when the table 76 is in the stowed condition. The central panel 62 is illustrated in the substantially vertical, closed position. In this position, the central panel 62 mates with the central top surface 32.

The sideboard 10 defines a table compartment 126 behind the central panel 62 and below the central top surface 32. The table 76 is stowed in the table compartment 126 when the table is in the stowed condition.

Figure 24:
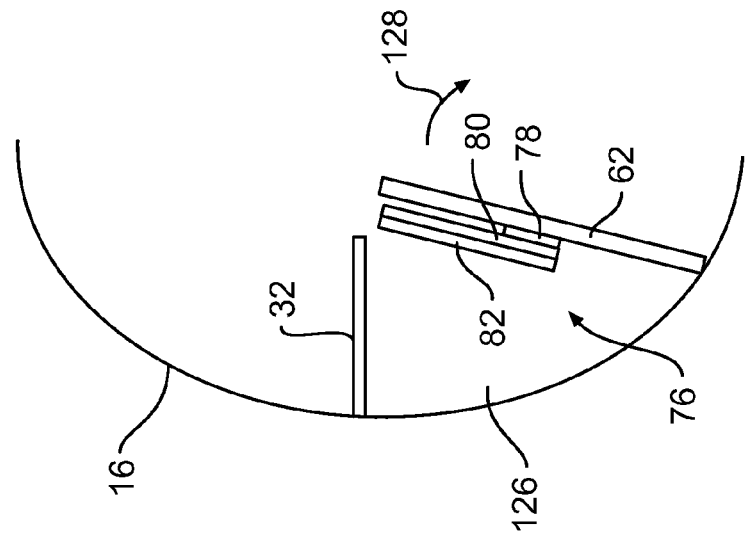
FIG. 24 is a graphical, end view of the sideboard illustrated in FIG. 23, showing a first step in the deployment of the table.

FIG. 24 illustrates the first step in the deployment of the table 76. Specifically, FIG. 24 shows the condition of the table 76 after the central panel 62 has been pivoted inwardly toward the centerline of the aircraft 12 along the direction of the arrow 128. In this view, the central panel 62 is angled from the substantially vertical position, which is shown in FIG. 23. The table 76, which is in a folded state, is behind the central panel 62. As illustrated, the table 76 tilts together with the central panel 62.

In connection with the illustrations provided in FIGS. 23 and 24, it is contemplated that the sideboard 10 will be provided with a latch mechanism. The latch is contemplated to retain the central panel 62 in the substantially vertical position when the table 76 is in the stowed condition. As should be apparent, to tilt the central panel 62 from the substantially vertical position, the latch is released.

It is contemplated that the latch will be a mechanical latch that is operable by the passenger's fingers. Alternatively, the latch may be electronically operated by pressing a button. Still further, the opening of the central panel 62 may be controlled by one or more of the display panels 42. Still further variations for the opening of the central panel 62 are contemplated to fall within the scope of the present invention.

Figure 25:
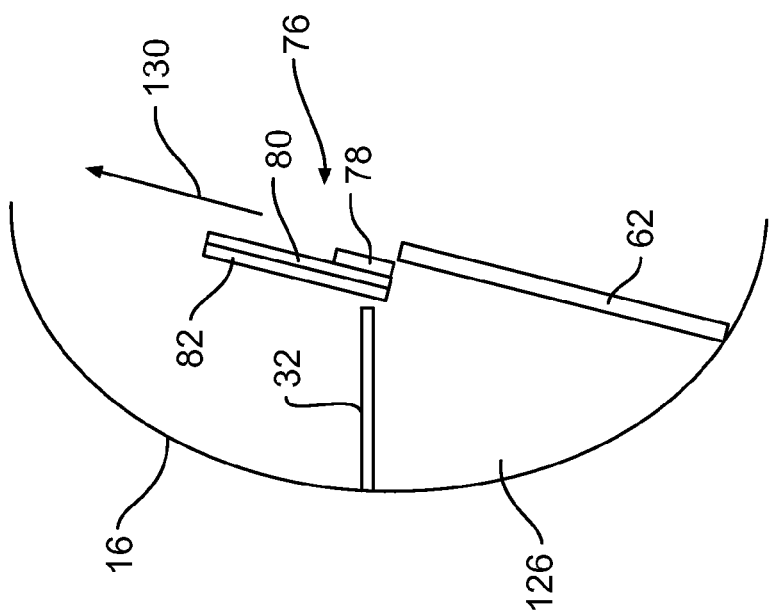
FIG. 25 is a graphical, end view of the sideboard illustrated in FIG. 23, showing a second step in the deployment of the table.

FIG. 25 illustrates the second step in the deployment of the table 76. Here, the table 76 has been drawn outside of the table compartment 126. Specifically, the table 76 slides out from the table compartment 126 along the direction of the arrow 130 until the table 76 is completely exposed, exterior to the table compartment 126.

Figure 26:
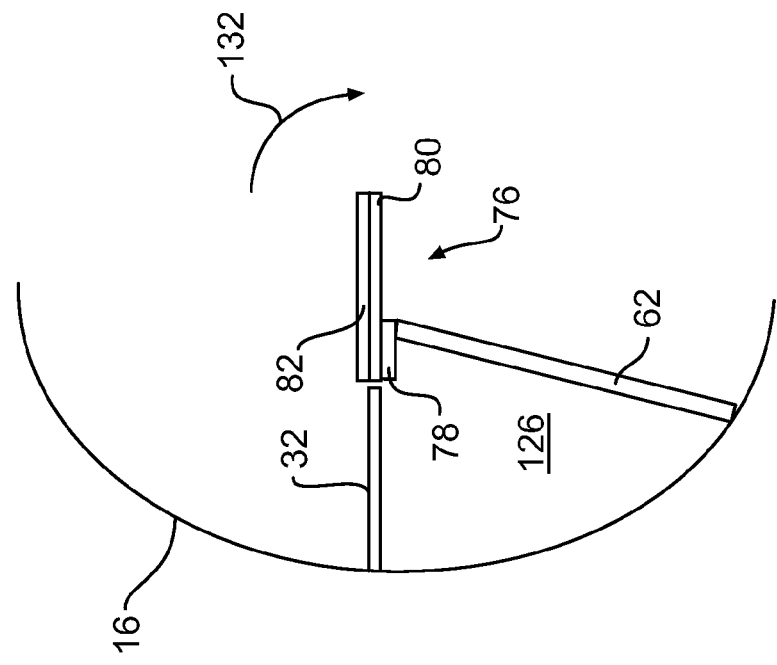
FIG. 26 is a graphical, end view of the sideboard illustrated in FIG. 23, showing a third step in the deployment of the table.

FIG. 26 illustrates the third step in the deployment of the table 76. Here, the table 76, which is in a folded condition, is rotated into a horizontal arrangement as indicated by the arrow 132. The table 76, in its folded state, is then positioned horizontally.

In the condition illustrated in FIG. 26, the table 76 is in a folded state. In the folded state, the top surface of the table 76 is defined by the second leaf 82. The first leaf 80 is flush with the central top surface 32. It is contemplated that the table 76 may be used as a table in the folded condition that is illustrated in FIG. 26. As should be apparent, when in the folded condition, the table 76 presents half of its total surface area to the passengers in the seats 86, 88.

It is noted that the leaves 80, 82 of the table 76 need not be exactly the same size as illustrated. One of the leaves 80, 82 may be larger than the other without departing from the scope of the present invention.

FIG. 27 illustrates the fourth and final step in the deployment of the table 76 to its fully deployed condition. In this view, the leaf 82 is pivoted in the direction of the arrow 132 so that the leaf 82 abuts against the leaf 80. In this orientation, the table 76 presents its full surface area, as shown.

It is noted that, while the table 76 is illustrated as having two leaves 80, 82, the table may be constructed with a single leaf or with a plurality of leaves without departing from the scope of the present invention.

As should be apparent from FIGS. 23-27, one aspect of the present invention is that the table 76 is deployable from the stowed condition without any manipulation of the central top surface 32. As noted above, the central top surface 32 is fixed in position throughout the four steps of the deployment of the table 76.

As also should be apparent, and as suggested above, it is contemplated that the table 76 will be deployed manually from the stowed condition by one of the passengers 90 or by one of the flight crew. Alternatively, it is contemplated that the table may be deployable mechanically and/or electro-mechanically without departing from the scope of the present invention.

With respect to the sideboard 10, it is noted that the sideboard 10 is described and illustrated in connection with a construction that contemplates two seats 86, 88 being positioned adjacent thereto. It is noted, however, that the sideboard 10 may include only one half of the total structure without departing from the scope of the present invention. Specifically, the sideboard 10 may be constructed to be divided in half (or any other suitable shortened version) to be positioned adjacent to a single seat 86 or 88. As should be apparent, a sideboard 10 with a shortened construction may be required if the space constraints in the aircraft 12 do not permit deployment of the full sideboard 10. As also should be apparent, if the sideboard 10 is reduced in size, so too will the table 76 be reduced in size.

As noted above, the present invention is described in connection with one or more embodiments thereof. The embodiments are intended to be illustrative of the breadth of the present invention. Focus on any one particular embodiment is not intended to be limiting thereof. The present invention, therefore, is intended to encompass variations and equivalents, as would be appreciated by those skilled in the art.

What is claimed is:

1. A sideboard for an aircraft, comprising:
   a first portion comprising a first top surface and a first panel, wherein the first top surface is disposed substantially horizontally at a first height and wherein the first panel is disposed substantially vertically adjacent to the first top surface;
   a second portion disposed adjacent to the first portion at a first end of the first portion, the second portion comprising a second top surface and a second panel, wherein the second top surface is disposed substantially horizontally at a second height and wherein the second panel is disposed substantially vertically adjacent to the second top surface;
   a table disposed interiorly to the first portion, wherein the table is disposed within the first portion in a stowed condition and the table is extendible from the first portion in a deployed condition;
   a first display disposed in a first display panel angled surface forming a part of a first transition region; and
   wherein the first top surface is immovable and the table is deployable by tilting the first panel along a pivot axis defined adjacent to a bottom end of the first panel, and
   wherein, in the deployed condition, a top surface of the table is at substantially a same height as the first height of the first top surface.

2. The sideboard of claim 1, wherein the first height is greater than the second height.

3. The sideboard of claim 1, wherein the first transition region extends between the first top surface and the second top surface.

4. The sideboard of claim 1, further comprising:
   a first cup holder disposed on the first top panel adjacent to the second top panel.

5. The sideboard of claim 1, further comprising a third portion disposed adjacent to the first portion at a second end of the first portion, the third portion comprising a third top surface and a third panel, wherein the third top surface is disposed substantially horizontally at a third height and wherein the third panel is disposed substantially vertically adjacent to the third top surface.

6. The sideboard of claim 5, wherein the first height is greater than both the second height and the third height.

7. The sideboard of claim 6, wherein the second height is substantially equal to the third height.

8. The sideboard of claim 5, further comprising a second transition region extending between the first top surface and the third top surface.

9. The sideboard of claim 8, further comprising a second display disposed in a second display panel angled surface forming a part of the second transition region.

10. The sideboard of claim 5, further comprising:
a second cup holder disposed on the first top panel adjacent to the third top panel.

11. The sideboard of claim 1, wherein the table comprises:
a first leaf pivotally connected adjacent to the first panel; and
a second leaf pivotally connected to the first leaf,
wherein the second leaf and the first leaf are capable of folding open when the table is in the deployed condition, thereby increasing a surface area of the table.

12. The sideboard of claim 1, further comprising;
at least one rail disposed interiorly to the central panel defining a track therein,
wherein the table is pivotally and slidingly connected to the at least one rail.

13. The sideboard of claim 1, further comprising:
a first compartment disposed beneath the second top surface; and
a second compartment disposed beneath the third top surface,
wherein the second top surface and the third top surface are openable to provide access to the first compartment and to the second compartment.

14. A sideboard for an aircraft, comprising:
a first portion comprising a first top surface and a first panel, wherein the first top surface is disposed substantially horizontally at a first height and wherein the first panel is disposed substantially vertically adjacent to the first top surface;
a second portion disposed adjacent to the first portion at a first end of the first portion, the second portion comprising a second top surface and a second panel, wherein the second top surface is disposed substantially horizontally at a second height and wherein the second panel is disposed substantially vertically adjacent to the second top surface;
a first transition region providing a first angled surface that extends between the first top surface and the second top surface;
a first display disposed in the first angled surface of the first transition region; and
a table, wherein the table is disposed within the first portion in a stowed condition and the table is extendible from the first portion in a deployed condition;
wherein, in the deployed condition, a top surface of the table is at substantially a same height as the first height of the first top surface.

15. The sideboard of claim 14, further comprising:
a first cup holder disposed on the first top panel adjacent to the second top panel.

16. The sideboard of claim 14, wherein the first height is greater than the second height.

17. The sideboard of claim 14, further comprising a third portion disposed adjacent to the first portion at a second end of the first portion, the third portion comprising a third top surface and a third panel, wherein the third top surface is disposed substantially horizontally at a third height and wherein the third panel is disposed substantially vertically adjacent to the third top surface.

18. The sideboard of claim 17, wherein the first height is greater than both the second height and the third height.

19. The sideboard of claim 18, wherein the second height is substantially equal to the third height.

20. The sideboard of claim 17, further comprising a second transition region providing a second angled surface that extends between the first top surface and the third top surface.

21. The sideboard of claim 20, further comprising a second display disposed in a second angled surface of the second transition region.

22. The sideboard of claim 17, further comprising:
a second cup holder disposed on the first top panel adjacent to the third top panel.

23. The sideboard of claim 14, wherein the table comprises:
a first leaf pivotally connected adjacent to the first panel; and
a second leaf pivotally connected to the first leaf,
wherein the second leaf and the first leaf are capable of folding open when the table is in the deployed condition, thereby increasing a surface area of the table.

24. The sideboard of claim 14, further comprising;
at least one rail disposed interiorly to the central panel defining a track therein,
wherein the table is pivotally and slidingly connected to the at least one rail.

* * * * *